United States Patent
Nakashima et al.

(10) Patent No.: US 10,348,407 B2
(45) Date of Patent: Jul. 9, 2019

(54) RECEIVING DEVICE AND RECEIVING METHOD

(71) Applicant: FUJITSU LIMITED, Kawasaki-shi, Kanagawa (JP)

(72) Inventors: Hisao Nakashima, Kawasaki (JP); Takeshi Hoshida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 10 days.

(21) Appl. No.: 15/888,141

(22) Filed: Feb. 5, 2018

(65) Prior Publication Data
US 2018/0227056 A1  Aug. 9, 2018

(30) Foreign Application Priority Data
Feb. 7, 2017  (JP) .................................. 2017-00553

(51) Int. Cl.
*H04B 10/61* (2013.01)
*H04J 14/02* (2006.01)
*H04B 10/2543* (2013.01)
*H04B 10/2557* (2013.01)
*H04B 10/00* (2013.01)

(52) U.S. Cl.
CPC ..... *H04B 10/2543* (2013.01); *H04B 10/2557* (2013.01); *H04B 10/6163* (2013.01); *H04B 10/6166* (2013.01); *H04J 14/02* (2013.01); *H04B 10/612* (2013.01); *H04B 10/6164* (2013.01); *H04B 10/6165* (2013.01)

(58) Field of Classification Search
CPC ............ H04B 10/2543; H04B 10/6166; H04B 10/612; H04B 10/6164; H04B 10/6165; H04J 14/052

USPC .......................................... 398/79, 205, 208
See application file for complete search history.

(56) References Cited

U.S. PATENT DOCUMENTS

| | | | | |
|---|---|---|---|---|
| 8,401,403 B2* | 3/2013 | Rollins | ................ | H04B 10/299 398/208 |
| 8,805,188 B2* | 8/2014 | Kikuchi | ................ | H04B 10/532 398/152 |
| 8,805,209 B2* | 8/2014 | Li | ...................... | H04B 10/2543 398/140 |
| 9,564,976 B2* | 2/2017 | Yu | ...................... | H04B 10/6164 |
| 2003/0170028 A1* | 9/2003 | Mori | ................... | H04B 10/2537 398/79 |
| 2005/0013353 A1* | 1/2005 | Alloin | .................... | H04B 3/141 375/222 |
| 2006/0013590 A1* | 1/2006 | Hueda | .................... | H04B 10/60 398/149 |

(Continued)

FOREIGN PATENT DOCUMENTS

| | | |
|---|---|---|
| JP | 2016-100815 | 5/2016 |
| WO | 2015/052895 | 4/2015 |

*Primary Examiner* — Oommen Jacob
(74) *Attorney, Agent, or Firm* — Fujitsu Patent Center

(57) ABSTRACT

There is provided a receiving device including a hardware processor configured to demodulate a signal into which a first signal and a second signal are wavelength-multiplexed, into a first baseband signal and a second baseband signal corresponding to the first signal and the second signal, respectively, extract, from the second baseband signal, a signal component of crosstalk from the second signal to the first signal, shift a frequency of the extracted signal component, and compensate for the crosstalk from the second signal to the first signal, based on the extracted signal component shifted by the frequency.

12 Claims, 22 Drawing Sheets

(56) References Cited

U.S. PATENT DOCUMENTS

| | | | |
|---|---|---|---|
| 2008/0232816 A1* | 9/2008 | Hoshida | H04B 10/532 398/152 |
| 2009/0214215 A1* | 8/2009 | Li | H04B 10/2507 398/81 |
| 2014/0099108 A1* | 4/2014 | Yu | H04B 10/64 398/48 |
| 2014/0140699 A1* | 5/2014 | Eiselt | H04B 3/32 398/65 |
| 2014/0199076 A1* | 7/2014 | Yu | H04J 14/02 398/81 |
| 2014/0314415 A1* | 10/2014 | Vassilieva | H04J 14/0227 398/76 |
| 2015/0222357 A1* | 8/2015 | Habel | H04B 10/506 398/26 |
| 2015/0333838 A1* | 11/2015 | Horikoshi | H04L 27/066 398/208 |
| 2016/0065313 A1* | 3/2016 | Yu | H04L 25/0305 398/208 |
| 2017/0063408 A1* | 3/2017 | Zamani | H04B 1/40 |
| 2017/0214485 A1* | 7/2017 | Yu | H04L 27/2601 |
| 2017/0254957 A1* | 9/2017 | Nakano | G02F 1/01 |
| 2017/0343750 A1* | 11/2017 | Ashrafi | H04B 10/516 |
| 2017/0353242 A1* | 12/2017 | Mansouri Rad | H04B 3/32 |
| 2018/0034552 A1* | 2/2018 | Oyama | G02B 6/12009 |
| 2018/0034556 A1* | 2/2018 | Willner | H04B 10/1121 |

\* cited by examiner

RECEIVING DEVICE AND RECEIVING METHOD

CROSS-REFERENCE TO RELATED APPLICATION

This application is based upon and claims the benefit of priority of the prior Japanese Patent Application No. 2017-020553, filed on Feb. 7, 2017, the entire contents of which are incorporated herein by reference.

FIELD

The embodiments discussed herein are related to a receiving device and a receiving method.

BACKGROUND

A technique for performing a crosstalk compensation by MIMO processing on a wavelength division multiplexed optical signal propagating through an optical fiber transmission line having wavelength dispersion is known in the related art. A technique for applying MIMO processing to compensate for a crosstalk between spatially multiplexed signals and separate them from each other is also known. MIMO is an acronym for multiple input multiple output.

Related techniques are disclosed in, for example, Japanese Laid-Open Patent Publication No. 2016-100815 and International Publication Pamphlet No. WO 2015/052895.

SUMMARY

According to an aspect of the invention, a receiving device includes a hardware processor configured to demodulate a signal into which a first signal and a second signal are wavelength-multiplexed, into a first baseband signal and a second baseband signal corresponding to the first signal and the second signal, respectively, extract, from the second baseband signal, a signal component of crosstalk from the second signal to the first signal, shift a frequency of the extracted signal component, and compensate for the crosstalk from the second signal to the first signal, based on the extracted signal component shifted by the frequency.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the above-described related art, the scale of a circuit for compensating a crosstalk may increase in some cases. For example, a process of compensating the crosstalk is performed based on a signal to be compensated and an adjacent signal. For this reason, for example, a wide signal band is required for a frequency shifter that performs frequency shift of the adjacent signal and a circuit that performs MIMO processing, which may result in the increase in the scale of the circuit. The compensation of the crosstalk is, for example, to remove at least a portion of a crosstalk component included in a signal (a signal component leaked out from another signal).

Embodiments of a technique capable of compensating a crosstalk while suppressing an increase in a circuit scale will be described in detail below with reference to the accompanying drawings.

First Embodiment (Receiving Device According to First Embodiment)

Figure 1:
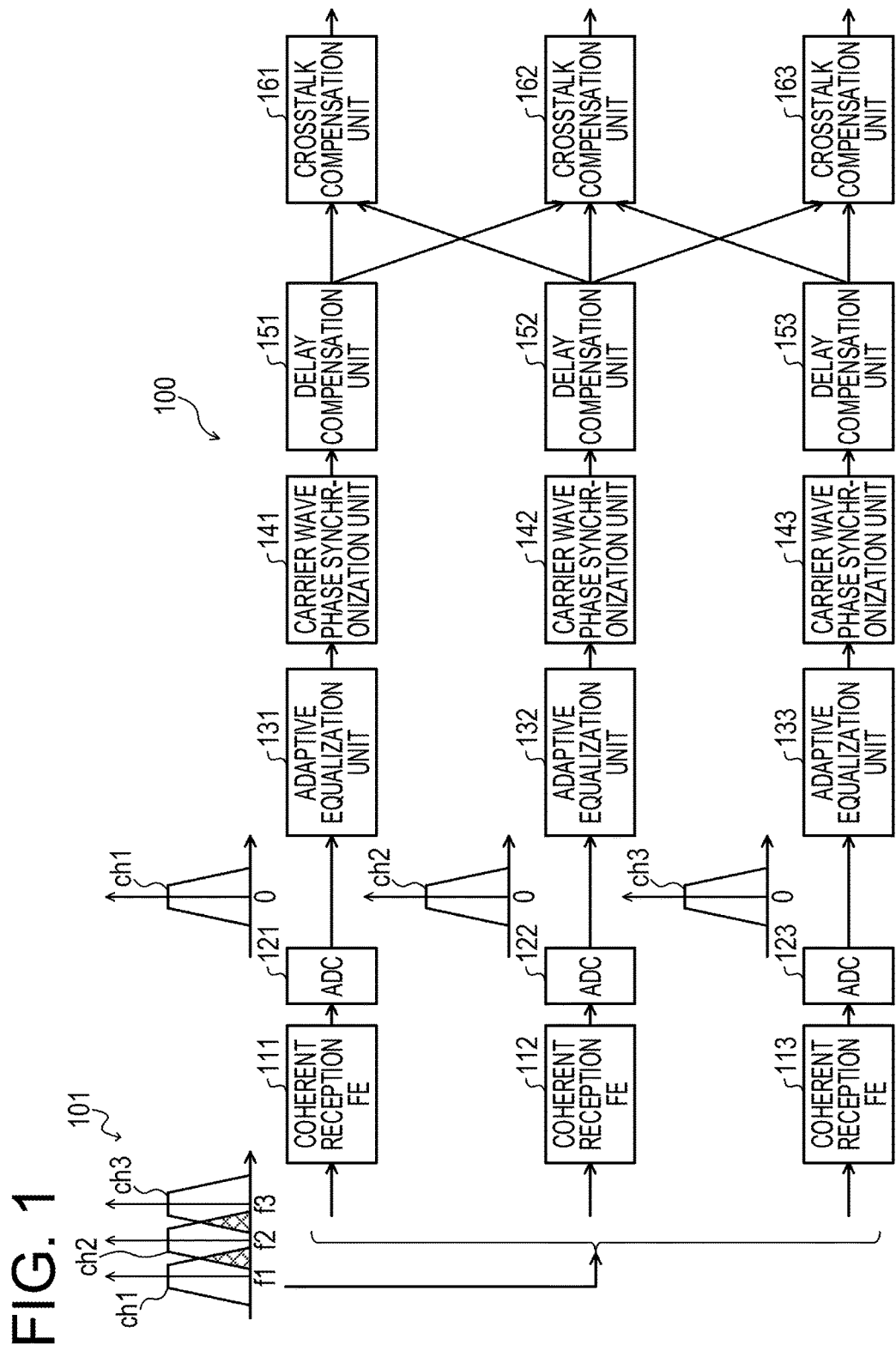
FIG. 1 is a view illustrating an example of a receiving device according to a first embodiment.

FIG. 1 is a view illustrating an example of a receiving device according to a first embodiment. As illustrated in FIG. 1, the receiving device 100 according to the first embodiment includes, for example, coherent receiving FEs 111 to 113, ADCs 121 to 123, and adaptive equalization units 131 to 133. The receiving device 100 further includes, for example, carrier wave phase synchronization units 141 to 143, delay compensation units 151 to 153, and crosstalk compensation units 161 to 163. FE is an acronym for front-end. ADC is an acronym for analog/digital converter.

The receiving device 100 receives signal light 101, for example. The signal light 101 is an optical signal transmitted from a counterpart of the receiving device 100 via an optical transmission line. In addition, the signal light 101 is signal light obtained by multiplexing a plurality of optical signals having different wavelengths. In the example illustrated in FIG. 1, optical signals of channels ch1 to ch3 are wavelength-multiplexed in the signal light 101. The center frequency of the optical signal of the channel ch1 is a frequency f1. The center frequency of the optical signal of the channel ch2 is a frequency f2. The center frequency of the optical signal of the channel ch3 is a frequency f3.

For example, the signal light 101 is signal light obtained by wavelength-multiplexing the respective optical signals of the channels ch1 to ch3 at an optical stage. Alternatively, the signal light 101 may be signal light obtained by wavelength-multiplexing the signals (electric signals) of the channels ch1 to ch3 in an electric stage and converting them into an optical signal. As another alternative, the signal light 101 may be signal light obtained by combining wavelength multiplexing in the optical stage and wavelength multiplexing in the electric stage.

In addition, the band of the optical signal of the channel ch1 and the band of the optical signal of the channel ch2 partially overlap with each other. In addition, the band of the optical signal of the channel ch2 and the band of the optical signal of the channel ch3 partially overlap with each other. Therefore, a crosstalk between the channels occurs in the signal light 101. The receiving device 100 accurately decodes each signal included in the signal light 101 by compensating a crosstalk of each signal included in the received signal light 101. The compensation of the crosstalk of the signal is, for example, to remove at least a portion of a crosstalk component included in the signal (e.g., a signal component leaked out from another signal).

The signal light 101 is branched by, for example, a branching unit such as an optical coupler and is incident into each of the coherent receiving FEs 111 to 113. The coherent receiving FE 111 is an optical front end that coherently receives the optical signal of the channel ch1 included in the incident signal light 101 using local light emission. For example, the coherent receiving FE 111 mixes the incident signal light 101 and the local light emission of the frequency f1, and receives the mixture. As a result, a baseband signal of the channel ch1 included in the signal light 101 is obtained. The coherent receiving FE 111 outputs the obtained signal of the channel ch1 to the ADC 121.

Similarly, the coherent receiving FE 112 coherently receives the optical signal of the channel ch2 included in the incident signal light 101 using the local light emission of the frequency f2 and outputs a signal of the channel ch2 obtained by the coherent reception to the ADC 122. In addition, the coherent receiving FE 113 coherently receives the optical signal of the channel ch3 included in the incident signal light 101 using the local light emission of the frequency f3 and outputs a signal of the channel ch3 obtained by the coherent reception to the ADC 123.

The ADC 121 converts the signal of the channel ch1 output from the coherent receiving FE 111 from an analog signal to a digital signal and outputs the obtained digital signal to the adaptive equalization unit 131. The ADC 122 converts the signal of the channel ch2 output from the coherent receiving FE 112 from an analog signal to a digital signal and outputs the converted digital signal to the adaptive equalization unit 132. The ADC 123 converts the signal of the channel ch3 output from the coherent receiving FE 113 from an analog signal to a digital signal and outputs the converted digital signal to the adaptive equalization unit 133.

The adaptive equalization units 131 to 133, the carrier wave phase synchronization units 141 to 143, and the delay compensation units 151 to 153 are demodulation processing units that demodulate signals for the different channels in the baseband.

The adaptive equalization unit 131 performs an adaptive equalization process on the signal of the channel ch1 output from the ADC 121. As a result, an X polarized signal and a Y polarized signal included in the signal of the channel ch1 are obtained. The X polarized signal and the Y polarized signal are, for example, polarized components whose polarization directions are orthogonal to each other. The adaptive equalization unit 131 outputs the obtained X polarized signal and Y polarized signal of the channel ch1 to the carrier wave phase synchronization unit 141.

Similarly, the adaptive equalization unit 132 performs an adaptive equalization process on the signal of the channel ch2 output from the ADC 122 to obtain an X polarized signal and a Y polarized signal of the channel ch2, which are then output to the carrier wave phase synchronization unit 142. In addition, the adaptive equalization unit 133 performs an adaptive equalization process on the signal of the channel ch3 output from the ADC 123 to obtain an X polarized signal and a Y polarized signal of the channel ch3, which are then output to the carrier wave phase synchronization unit 143.

The carrier wave phase synchronization unit 141 performs a carrier wave phase synchronization process on the X polarized signal and the Y polarized signal of the channel ch1 output from the adaptive equalization unit 131. The carrier wave phase synchronization process may be performed, for example, by performing timing synchronization, polarization separation, and carrier wave phase reproduction and restoring a constellation. The carrier wave phase synchronization unit 141 outputs the respective signals subjected to the carrier wave phase synchronization process to the delay compensation unit 151.

Similarly, the carrier wave phase synchronization unit 142 performs a carrier wave phase synchronization process on the X polarized signal and the Y polarized signal of the channel ch2 output from the adaptive equalization unit 132. Then, the carrier wave phase synchronization unit 142 outputs the X polarized signal and the Y polarized signal of the channel ch2 subjected to the carrier wave phase synchronization process to the delay compensation unit 152. In addition, the carrier wave phase synchronization unit 143 performs a carrier wave phase synchronization process on the X polarized signal and the Y polarized signal of the channel ch3 output from the adaptive equalization unit 133. Then, the carrier wave phase synchronization unit 143 outputs the X polarized signal and the Y polarized signal of the channel ch3 subjected to the carrier wave phase synchronization process to the delay compensation unit 153.

The delay compensation unit 151 performs a delay compensation on the X polarized signal and the Y polarized signal of the channel ch1 output from the carrier wave phase synchronization unit 141, and outputs the respective signals subjected to the delay compensation to the crosstalk compensation units 161 and 162. As a result, the demodulated X polarized signal and Y polarized signal of the channel ch1 are output to the crosstalk compensation units 161 and 162. The delay compensation may be performed, for example, by compensating a group delay difference between the channels based on a frequency spacing between the optical signals and a dispersion value in an optical transmission line through which the signal light 101 is transmitted.

Similarly, the delay compensation unit 152 performs delay compensation on the X polarized signal and the Y polarized signal of the channel ch2 output from the carrier wave phase synchronization unit 142, and outputs the respective signals subjected to the delay compensation to the crosstalk compensation units 161 to 163. As a result, the demodulated X polarized signal and Y polarized signal of the channel ch2 are output to the crosstalk compensation units 161 to 163.

In addition, the delay compensation unit 153 performs delay compensation on the X polarized signal and the Y polarized signal of the channel ch3 output from the carrier wave phase synchronization unit 143, and outputs the respective signals subjected to the delay compensation to the crosstalk compensation units 162 and 163. As a result, the demodulated X polarized signal and Y polarized signal of the channel ch3 are output to the crosstalk compensation units 162 and 163.

The crosstalk compensation unit 161 compensates for a crosstalk from each signal of the channel ch2 with respect to each signal of the channel ch1 (e.g., the X polarized signal and the Y polarized signal) output from the delay compensation unit 151, based on each signal of the channel ch2 output from the delay compensation unit 152. Then, the crosstalk compensation unit 161 outputs each signal compensated for the crosstalk.

The crosstalk compensation unit 162 compensates for a crosstalk from each signal of the channels ch1 and ch3 with respect to each signal of the channel ch2 output from the delay compensation unit 152, based on each signal of the channels ch1 and ch3 output from the delay compensation units 151 and 153. Then, the crosstalk compensation unit 162 outputs each signal compensated for the crosstalk.

The crosstalk compensation unit 163 compensates for a crosstalk from each signal of the channel ch2 with respect to each signal of the channel ch3 output from the delay compensation unit 153, based on each signal of the channel ch2 output from the delay compensation unit 152. Then, the crosstalk compensation unit 163 outputs each signal compensated for the crosstalk.

The adaptive equalization units 131 to 133, the carrier wave phase synchronization units 141 to 143, the delay compensation units 151 to 153, and the crosstalk compensation units 161 to 163 illustrated in FIG. 1 may be implemented by a hardware processor (a digital circuit) such as DSP or FPGA. DSP is an acronym for digital signal processor. FPGA is an acronym for field programmable gate array.

In addition, the receiving device 100 may include a decoding unit that performs a decoding by determining each signal output from the crosstalk compensation units 161 to 163. Decoding of a signal may be carried out, for example, by determining a symbol corresponding to a combination of phase and amplitude of the signal. This decoding unit may be implemented by a hardware processor such as DSP or FPGA.

The coherent reception of signal light (e.g., the signal light 101) obtained by wavelength-multiplexing a first signal and a second signal may be implemented by, for example, the coherent receiving FEs 111 to 113. A demodulation unit that demodulates the first signal and the second signal based on a result of the coherent reception may be implemented by, for example, the adaptive equalization units 131 to 133, the carrier wave phase synchronization units 141 to 143, and the delay compensation units 151 to 153.

The configuration in which the receiving device 100 receives three wavelength-multiplexed optical signals has been described in the example illustrated in FIG. 1, but the present disclosure is not limited to such a configuration. For example, the receiving device 100 may be configured to receive two or four or more wavelength-multiplexed optical signals. For example, in a case of receiving N wavelength-multiplexed optical signals, the receiving device 100 includes N coherent receiving FEs, N ADCs, N adaptive equalization units, N carrier wave phase synchronization units, N delay compensation units, and N crosstalk compensation units.

(Crosstalk Compensation Unit (ch1) According to First Embodiment)

Figure 2:
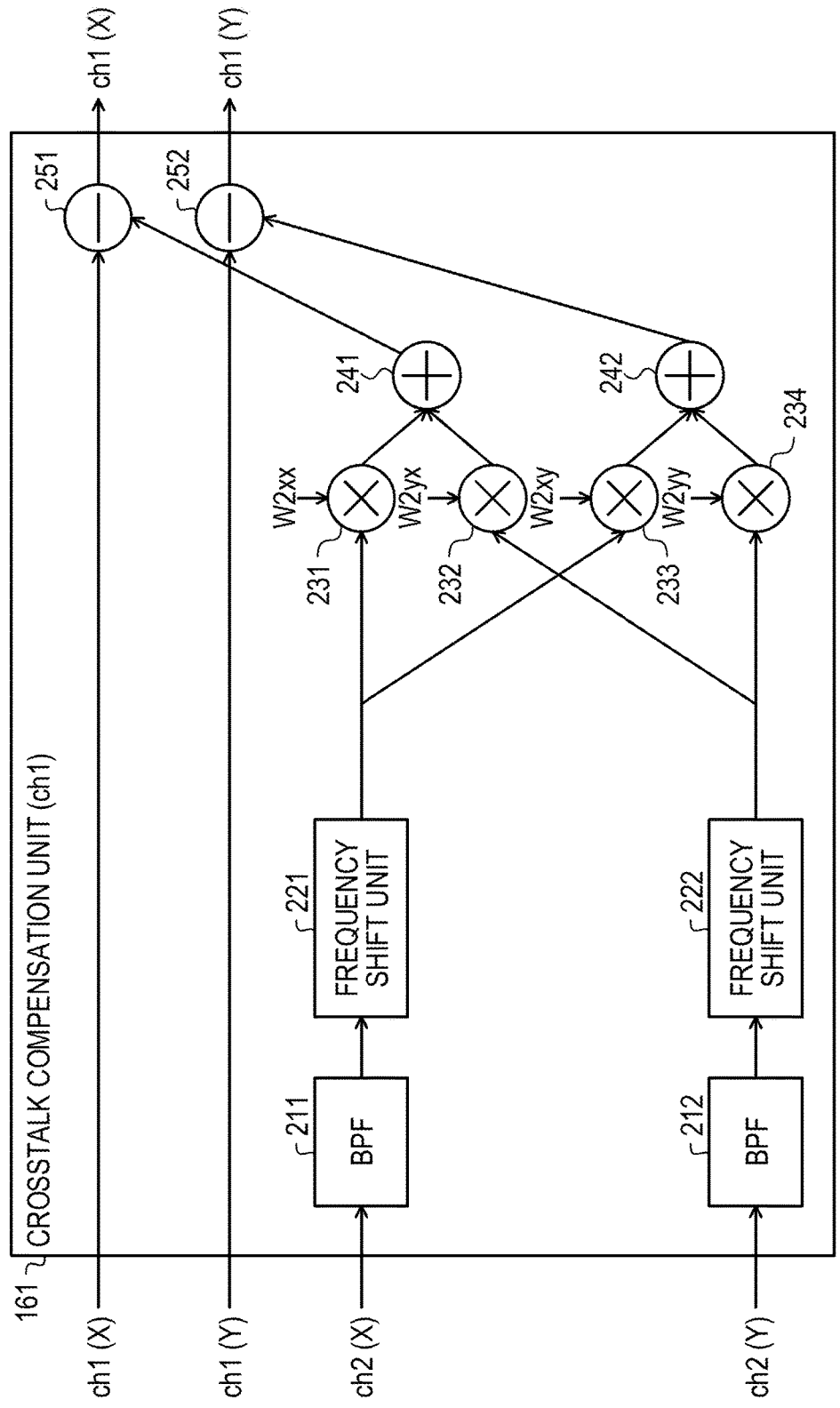
FIG. 2 is a view illustrating an example of a crosstalk compensation unit (ch1) according to the first embodiment.

FIG. 2 is a view illustrating an example of the crosstalk compensation unit (ch1) according to the first embodiment. The crosstalk compensation unit 161 that compensates for a crosstalk from each signal of the channel ch2 with respect to each signal of the channel ch1 (e.g., the X polarized signal and the Y polarized signal) will be described below. Referring to FIG. 2, the crosstalk compensation unit 161 may include BPFs 211 and 212, frequency shift units 221 and 222, multiplication units 231 to 234, addition units 241 and 242, and subtraction units 251 and 252. BPF is an acronym for band pass filter.

The X polarized signal of the channel ch2 output from the delay compensation unit 152 illustrated in FIG. 1 is input to the BPF 211. The BPF 211 extracts a signal component on the low frequency side of the input X polarized signal of the channel ch2 to extract a signal component that becomes a crosstalk with respect to the signal of the channel ch1 in the X polarized signal of the channel ch2. Then, the BPF 211 outputs the extracted signal component to the frequency shift unit 221.

The Y polarized signal of the channel ch2 output from the delay compensation unit 152 illustrated in FIG. 1 is input to the BPF 212. The BPF 211 extracts a signal component on the low frequency side of the input Y polarized signal of the channel ch2 to extract a signal component that becomes a crosstalk with respect to the signal of the channel ch1 in the Y polarized signal of the channel ch2. Then, the BPF 212 outputs the extracted signal component to the frequency shift unit 222.

The frequency shift unit 221 frequency-shifts the signal component output from the BPF 211. For example, the frequency shift unit 221 shifts the frequency of the signal component output from the BPF 211 to the high frequency side by f2-f1. The frequency shift unit 221 outputs the frequency-shifted signal component to the multiplication units 231 and 233.

The frequency shift unit 222 frequency-shifts the signal component output from the BPF 212. For example, the frequency shift unit 222 shifts the frequency of the signal component output from the BPF 212 to the high frequency side by f2-f1. The frequency shift unit 222 outputs the frequency-shifted signal component to the multiplication units 232 and 234.

The multiplication units 231 to 234, the addition units 241 and 242, and the subtraction units 251 and 252 are compensation units that perform a crosstalk compensation by MIMO.

The multiplication unit 231 multiplies the signal component output from the frequency shift unit 221 by a coefficient W2xx and outputs the multiplied signal component to the addition unit 241. The multiplication unit 232 multiplies the signal component output from the frequency shift unit 222 by a coefficient W2yx and outputs the multiplied signal component to the addition unit 241. The multiplication unit 233 multiplies the signal component output from the frequency shift unit 221 by a coefficient W2xy and outputs the multiplied signal component to the addition unit 242. The multiplication unit 234 multiplies the signal component output from the frequency shift unit 222 by a coefficient W2yy and outputs the multiplied signal component to the addition unit 242.

The addition unit 241 adds the signal components output from the multiplication units 231 and 232 and outputs the added signal components to the subtraction unit 251. When the coefficients W2xx and W2yx are optimally adjusted, the signal component output from the addition unit 241 to the subtraction unit 251 indicates a crosstalk component due to the signal of the channel ch2 with respect to the X polarized signal of the channel ch1.

The addition unit 242 adds the signal components output from the multiplication units 233 and 234 and outputs the added signal components to the subtraction unit 252. When the coefficients W2xy and W2yy are optimally adjusted, the signal component output from the addition unit 242 to the subtraction unit 252 indicates a crosstalk component due to the signal of the channel ch2 with respect to the Y polarized signal of the channel ch1.

The X polarized signal of the channel ch1 output from the delay compensating unit 151 illustrated in FIG. 1 and the signal component output from the addition unit 241 are input to the subtraction unit 251. The subtraction unit 251 subtracts the signal component output from the addition unit 241 from the input X polarized signal of the channel ch1. This makes it possible to compensate for a crosstalk due to the signal of the channel ch2 with respect to the X polarized signal of the channel ch1. The subtraction unit 251 outputs the X polarized signal of the channel ch1 compensated for crosstalk.

The Y polarized signal of the channel ch1 output from the delay compensating unit 151 illustrated in FIG. 1 and the signal component output from the addition unit 242 are input to the subtraction unit 252. The subtraction unit 252 subtracts the signal component output from the addition unit 242 from the input Y polarized signal of the channel ch1. This makes it possible to compensate for a crosstalk due to the signal of the channel ch2 with respect to the Y polarized signal of the channel ch1. The subtraction unit 252 outputs the Y polarized signal of the channel ch1 compensated for crosstalk.

The crosstalk compensation unit 161 controls the coefficients W2xx, W2yx, W2xy, and W2yy in the multiplication units 231 to 234 based on an error rate of the signal of the channel ch1 obtained by the decoding unit at the subsequent stage of the crosstalk compensation unit 161. For example, the crosstalk compensation unit 161 monitors the error rate while changing a combination of coefficients, specifies each combination of coefficients with the lowest error rate, and sets the specified combination of coefficients in the multiplication units 231 to 234.

Further, the crosstalk compensation unit 161 may calculate the crosstalk amount for the signal of the channel ch1 based on the coefficients W2xx, W2yx, W2xy, and W2yy. For example, the crosstalk compensation unit 161 calculates the crosstalk amount for the signal of the channel ch1 by $W2xx^2+W2yx^2+W2xx^2+W2yy^2$. Then, the crosstalk compensation unit 161 outputs information indicating the calculated crosstalk amount.

For example, the receiving device 100 transmits the signal output from the crosstalk compensation unit 161 to the transmitting device of the transmission source of the signal light 101. As a result, the transmitting device of the transmission source of the signal light 101 may perform a process such as correcting a deviation of the frequency spacing of each channel. The deviation of the frequency spacing is caused by, for example, a frequency fluctuation of laser. Alternatively, the receiving device 100 may output the signal output from the crosstalk compensating unit 161 to the administrator of the receiving device 100. As a result, the administrator of the receiving device 100 may monitor a crosstalk in the signal received by the receiving device 100.

(Crosstalk Compensation Unit (ch2) According to First Embodiment)

Figure 3:
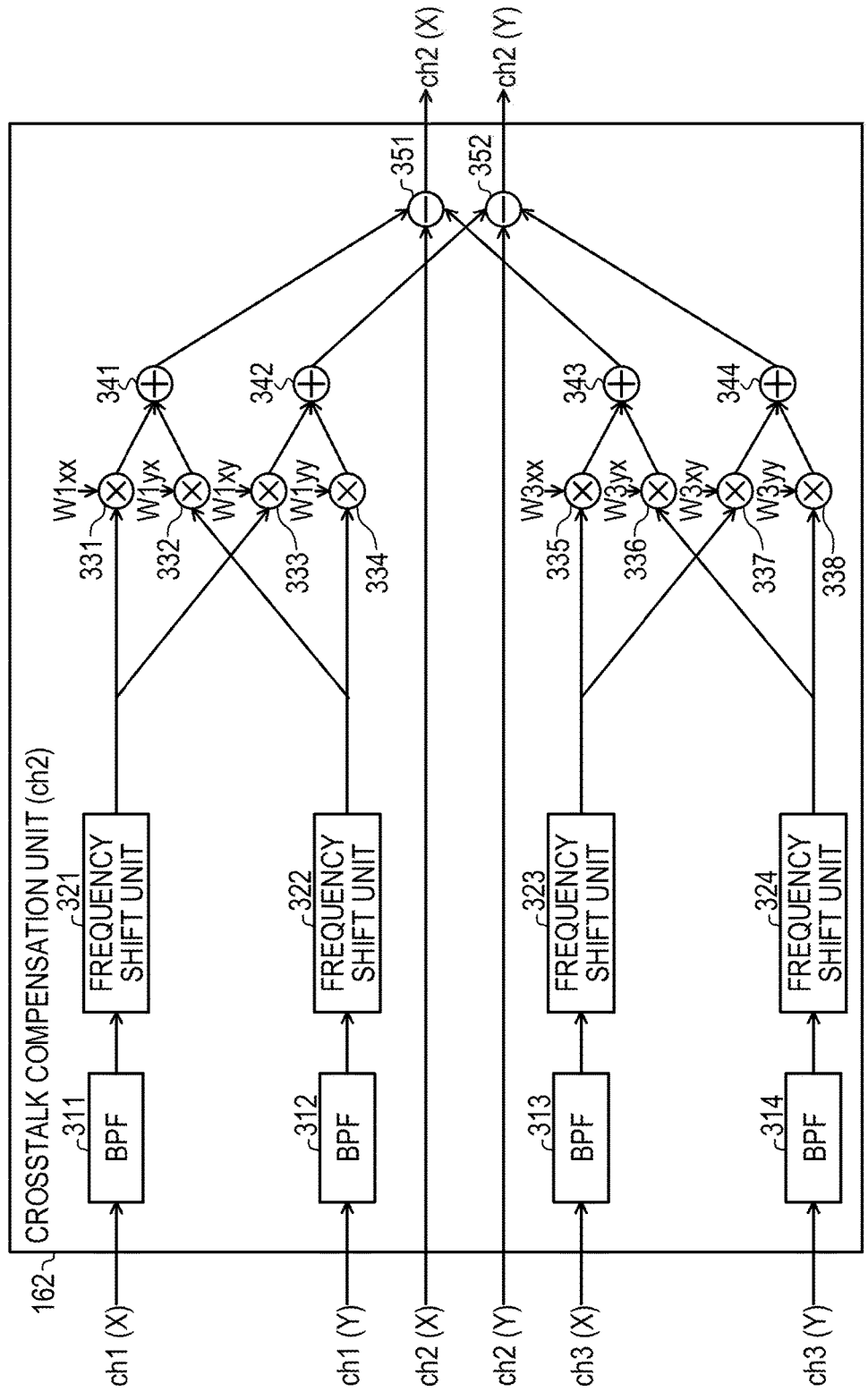
FIG. 3 is a view illustrating an example of a crosstalk compensation unit (ch2) according to the first embodiment.

FIG. 3 is a view illustrating an example of the crosstalk compensation unit (ch2) according to the first embodiment. The crosstalk compensation unit 162 that compensates for a crosstalk from each signal of the channels ch1 and ch3 with respect to each signal of the channel ch2 (e.g., the X polarized signal and the Y polarized signal) will be described below. Referring to FIG. 3, the crosstalk compensation unit 162 may include BPFs 311 to 314, frequency shift units 321 to 324, multiplication units 331 to 338, addition units 341 to 344, and subtraction units 351 and 352.

The X polarized signal of the channel ch1 output from the delay compensation unit 151 illustrated in FIG. 1 is input to the BPF 311. The BPF 311 extracts a signal component on the high frequency side of the input X polarized signal of the channel ch1 to extract a signal component that becomes a crosstalk with respect to the signal of the channel ch2 in the X polarized signal of the channel ch1. Then, the BPF 311 outputs the extracted signal component to the frequency shift unit 321.

The Y polarized signal of the channel ch1 output from the delay compensation unit 151 illustrated in FIG. 1 is input to the BPF 312. The BPF 312 extracts a signal component on the high frequency side of the input Y polarized signal of the channel ch1 to extract a signal component that becomes a crosstalk with respect to the signal of the channel ch2 in the Y polarized signal of the channel ch1. Then, the BPF 312 outputs the extracted signal component to the frequency shift unit 322.

The frequency shift unit 321 frequency-shifts the signal component output from the BPF 311. For example, the frequency shift unit 321 shifts the frequency of the signal component output from the BPF 311 to the low frequency side by f2-f1. The frequency shift unit 321 outputs the frequency-shifted signal component to the multiplication units 331 and 333.

The frequency shift unit 322 frequency-shifts the signal component output from the BPF 312. For example, the frequency shift unit 322 shifts the frequency of the signal component output from the BPF 312 to the low frequency side by f2-f1. The frequency shift unit 322 outputs the frequency-shifted signal component to the multiplication units 332 and 334.

The multiplication units 331 to 338, the addition units 341 to 344, and the subtraction units 351 and 352 are compensation units that perform a crosstalk compensation by MIMO.

The multiplication unit 331 multiplies the signal component output from the frequency shift unit 321 by a coefficient W1xx and outputs the multiplied signal component to the addition unit 341. The multiplication unit 332 multiplies the signal component output from the frequency shift unit 322 by a coefficient W1yx and outputs the multiplied signal component to the addition unit 341. The multiplication unit 333 multiplies the signal component output from the frequency shift unit 321 by a coefficient W1xy and outputs the multiplied signal component to the addition unit 342. The multiplication unit 334 multiplies the signal component output from the frequency shift unit 322 by a coefficient W1yy and outputs the multiplied signal component to the addition unit 342.

The addition unit 341 adds the signal components output from the multiplication units 331 and 332, and outputs the added signal components to the subtraction unit 351. When the coefficients W1xx and W1yx are optimally adjusted, the signal component output from the addition unit 341 to the subtraction unit 351 indicates a crosstalk component due to the signal of the channel ch1 with respect to the X polarized signal of the channel ch2.

The addition unit 342 adds the signal components output from the multiplication units 333 and 334, and outputs the added signal components to the subtraction unit 352. When the coefficients W1xy and W1yy are optimally adjusted, the signal component output from the addition unit 342 to the subtraction unit 352 indicates a crosstalk component due to the signal of the channel ch1 with respect to the Y polarized signal of the channel ch2.

The X polarized signal of the channel ch3 output from the delay compensating unit 153 illustrated in FIG. 1 is input to the BPF 313. The BPF 313 extracts a signal component on the low frequency side of the input X polarized signal of the channel ch3 to extract a signal component that becomes a crosstalk with respect to the signal of the channel ch2 in the X polarized signal of the channel ch3. Then, the BPF 313 outputs the extracted signal component to the frequency shift unit 323.

The Y polarized signal of the channel ch3 output from the delay compensation unit 153 illustrated in FIG. 1 is input to the BPF 314. The BPF 314 extracts a signal component on the low frequency side of the input Y polarized signal of the channel ch3 to extract a signal component that becomes a crosstalk with respect to the signal of the channel ch2 in the Y polarized signal of the channel ch3. Then, the BPF 314 outputs the extracted signal component to the frequency shift unit 324.

The frequency shift unit 323 frequency-shifts the signal component output from the BPF 313. For example, the frequency shift unit 323 shifts the frequency of the signal component output from the BPF 313 to the high frequency side by f3-f2. The frequency shift unit 323 outputs the frequency-shifted signal component to the multiplication units 335 and 337.

The frequency shift unit 324 frequency-shifts the signal component output from the BPF 314. For example, the frequency shift unit 324 shifts the frequency of the signal component output from the BPF 314 to the high frequency side by f3-f2. The frequency shift unit 324 outputs the frequency-shifted signal component to the multiplication units 336 and 338.

The multiplication unit 335 multiplies the signal component output from the frequency shift unit 323 by a coefficient W3xx and outputs the multiplied signal component to the addition unit 343. The multiplication unit 336 multiplies the signal component output from the frequency shift unit 324 by a coefficient W3yx and outputs the multiplied signal component to the addition unit 343. The multiplication unit 337 multiplies the signal component output from the frequency shift unit 323 by a coefficient W3xy and outputs the multiplied signal component to the addition unit 344. The multiplication unit 338 multiplies the signal component output from the frequency shift unit 324 by a coefficient W3yy and outputs the multiplied signal component to the addition unit 344.

The addition unit 343 adds the signal components output from the multiplication units 335 and 336, and outputs the added signal components to the subtraction unit 351. When the coefficients W3xx and W3yx are optimally adjusted, the signal component output from the addition unit 343 to the subtraction unit 351 indicates a crosstalk component due to the signal of the channel ch3 with respect to the X polarized signal of the channel ch2.

The addition unit 344 adds the signal components output from the multiplication units 337 and 338, and outputs the added signal components to the subtraction unit 352. When the coefficients W3xy and W3yy are optimally adjusted, the signal component output from the addition unit 344 to the subtraction unit 352 indicates a crosstalk component due to the signal of the channel ch3 with respect to the Y polarized signal of the channel ch2.

The X polarized signal of the channel ch2 output from the delay compensating unit 151 illustrated in FIG. 1 and the signal components output from the addition units 341 and 343 are input to the subtraction unit 351. The subtraction unit 351 subtracts the signal components output from the addition units 341 and 343 from the input X polarized signal of the channel ch2. This makes it possible to compensate for a crosstalk due to the signals of the channels ch1 and ch3 with respect to the X polarized signal of the channel ch2. The subtraction unit 351 outputs the X polarized signal of the channel ch2 compensated for crosstalk.

The Y polarized signal of the channel ch2 output from the delay compensating unit 151 illustrated in FIG. 1 and the signal components output from the addition units 342 and 344 are input to the subtraction unit 352. The subtraction unit 352 subtracts the signal components output from the addition units 342 and 344 from the input Y polarized signal of the channel ch2. This makes it possible to compensate for a crosstalk due to the signals of the channels ch1 and ch3 with respect to the Y polarized signal of the channel ch2. The subtraction unit 352 outputs the Y polarized signal of the channel ch2 compensated for crosstalk.

The crosstalk compensation unit 162 controls the coefficients W1xx, W1yx, W1xy, W1yy, W3xx, W3yx, W3xy, and W3yy in the multiplication units 331 to 338 based on an error rate of the signal of the channel ch2 obtained by the decoding unit at the subsequent stage of the crosstalk compensation unit 162. For example, the crosstalk compensation unit 162 monitors the error rate while changing a combination of coefficients, specifies each combination of coefficients with the lowest error rate, and sets the specified combination of coefficients in the multiplication units 331 to 338.

Further, the crosstalk compensation unit 162 may calculate the crosstalk amount for the signal of the channel ch2 based on the coefficients W1xx, W1yx, W1xy, W1yy, W3xx, W3yx, W3xy, and W3yy. For example, the crosstalk compensation unit 162 calculates the crosstalk amount for the signal of the channel ch2 by W1xx^2+W1yx^2+W1xx^2+W1yy^2+W3xx^2W3yx^2+W3xx^2+W3yy^2. Then, the crosstalk compensation unit 162 outputs information indicating the calculated crosstalk amount.

For example, the receiving device 100 transmits the signal output from the crosstalk compensation unit 162 to the transmitting device of the transmission source of the signal light 101. As a result, the transmitting device of the transmission source of the signal light 101 may perform a process such as correcting a deviation of the frequency spacing of each channel. Alternatively, the receiving device 100 may output the signal output from the crosstalk compensating unit 162 to the administrator of the receiving device 100. As a result, the administrator of the receiving device 100 may monitor a crosstalk in the signal received by the receiving device 100.

An extraction unit that extracts a signal component of crosstalk from the second signal to the first signal from a signal obtained by demodulation of the second signal may be implemented by, for example, the BPFs 211 and 212 illustrated in FIG. 2 or the BPFs 311 to 314 illustrated in FIG. 3. A shift unit that frequency-shifts the extracted signal component may be implemented by, for example, the frequency shift units 221 and 222 illustrated in FIG. 2 or the frequency shift units 321 to 324 illustrated in FIG. 3.

A compensation unit that compensates for a crosstalk on a signal obtained by demodulation of the first signal based on the frequency-shifted signal component may be implemented by, for example, the multiplication units 231 to 234, the addition units 241 and 242, and the subtraction units 251 and 252 illustrated in FIG. 2. Alternatively, this compensation unit may be implemented by the multiplication units 331 to 338, the addition units 341 to 344, and the subtraction units 351 and 352 illustrated in FIG. 3.

(Crosstalk Compensation Unit (ch3) According to First Embodiment)

The crosstalk compensation unit 163 that compensates for a crosstalk from the channel ch2 with respect to each signal of the channel ch3 has the same configuration as the crosstalk compensation unit 161 that compensates for the crosstalk from the channel ch2 with respect to each signal of the channel ch1 (see FIG. 2).

(Crosstalk Compensation by Receiving Device According to First Embodiment)

Figure 4:
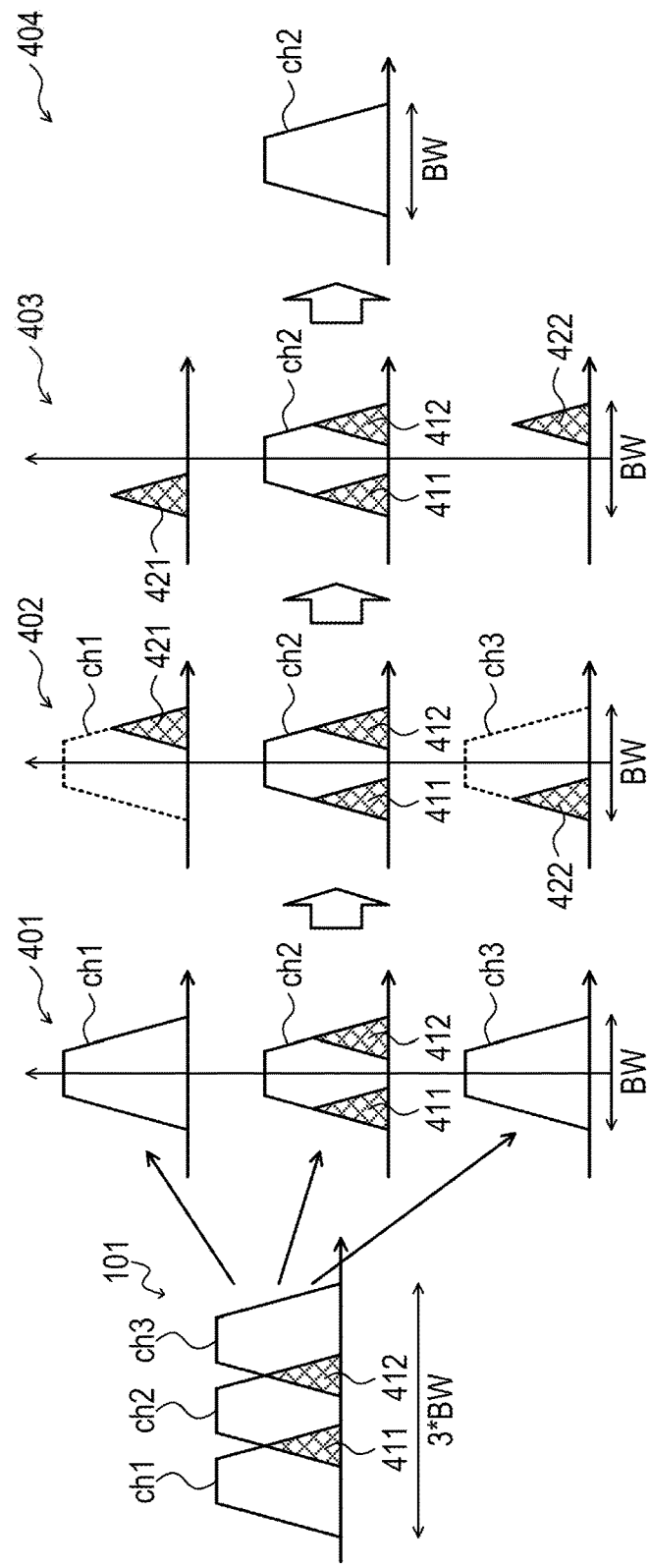
FIG. 4 is a view illustrating an example of compensation of crosstalk by the receiving device according to the first embodiment.

FIG. 4 is a view illustrating an example of crosstalk compensation by the receiving device according to the first embodiment. In FIG. 4, the same parts and units as in FIG. 1 are denoted by the same reference numerals, and explanation of which will not be repeated. The compensation of crosstalk from the signals of the channels ch1 and ch3 with respect to each signal (X polarized signal and Y polarized signal) of the channel ch2 by the crosstalk compensation unit 162 will be described below by way of an example with reference to FIG. 4.

In the signal light 101, BW represents a signal band per optical signal. Since the signal light 101 includes three optical signals of channels ch1 to ch3, the signal band of the signal light 101 is 3*BW. A crosstalk component 411 in the signal light 101 is a crosstalk component between the optical signals of the channels ch1 and ch2. A crosstalk component 412 in the signal light 101 is a crosstalk component between the optical signals of the channels ch2 and ch3.

Processing stages 401 to 404 in FIG. 4 are the stages of a receiving process by the receiving device 100. The signals of the channels ch1 to ch3 included in the signal light 101 are demodulated by the coherent receiving FEs 111 to 113, the ADCs 121 to 123, the adaptive equalization units 131 to 133, the carrier wave phase synchronization units 141 to 143, and the delay compensation units 151 to 153.

As a result, as shown in the processing stage 401, baseband channels ch1 to ch3 are obtained. At this time, the crosstalk component 411 between the signal of the channel ch2 and the signal of the channel ch1, and the crosstalk component 412 between the signal of the channel ch2 and the signal of the channel ch3, are included in the signal of the channel ch2 to be subjected to the crosstalk compensation.

Next, as shown in the processing stage 402, the crosstalk compensation unit 162 extracts a crosstalk component 421 of the signal of the channel ch1 with respect to the signal of the channel ch2 by the BPFs 311 and 312 illustrated in FIG. 3. In addition, the crosstalk compensation unit 162 extracts a crosstalk component 422 of the signal of the channel ch3 with respect to the signal of the channel ch2 by the BPFs 313 and 314 illustrated in FIG. 3.

Next, as shown in the processing stage 403, the crosstalk compensation unit 162 frequency-shifts the crosstalk component 421 of the channel ch1 to the low frequency side by the frequency shift units 321 and 322 illustrated in FIG. 3. As a result, the frequency of the crosstalk component 421 of the channel ch1 matches the frequency of the crosstalk component 411 of the channel ch2. In addition, the crosstalk compensation unit 162 frequency-shifts the crosstalk component 422 of the channel ch2 to the high frequency side by the frequency shift units 323 and 324 illustrated in FIG. 3. As a result, the frequency of the crosstalk component 422 of the channel ch2 matches the frequency of the crosstalk component 412 of the channel ch2.

The crosstalk component 421 of the channel ch1 in the processing stage 403 may be expressed as E'(1) of the following equation (1), for example. In this equation (1), $h(1)$ is an impulse response of the BPFs 311 and 312 illustrated in FIG. 3, for example. E(1) is a result of demodulation of the signal of the channel ch1 by the adaptive equalization unit 131, the carrier wave phase synchronization unit 141, and the delay compensation unit 151. $\Delta f$ is a frequency spacing (e.g., f2-f1) between the channel ch1 and an adjacent channel.

$$E'(1) = (h(1)*E(1)) \times \exp(-j2n\pi\Delta ft) \tag{1}$$

The signal of the channel ch2 in the processing stage 403 may be expressed as E'(2) of the following equation (2), for example. In this equation (2), E(2) is a result of demodulation of the signal of the channel ch2 by the adaptive equalization unit 132, the carrier wave phase synchronization unit 142, and the delay compensation unit 152.

$$E'(2) = E(2) \tag{2}$$

The crosstalk component 422 of the channel ch3 in the processing stage 403 may be expressed as E'(3) of the following equation (3), for example. In this equation (3), $h(3)$ is an impulse response of the BPFs 313 and 314 illustrated in FIG. 3, for example. E(3) is a result of demodulation of the signal of the channel ch3 by the adaptive equalization unit 133, the carrier wave phase synchronization unit 143, and the delay compensation unit 153. $\Delta f$ is a frequency spacing (e.g., f3-f2) between the channel ch3 and an adjacent channel.

$$E'(3) = (h(3)*E(3)) \times \exp(+j2n\pi\Delta ft) \tag{3}$$

Next, as shown in the process stage 404, the crosstalk compensation unit 162 weights the respective coefficients on the crosstalk components 421 and 422 by the multiplication units 331 to 338 and the addition units 341 to 344 illustrated in FIG. 3. Then, the crosstalk compensation unit 162 compensates for the crosstalk components 411 and 412 of the signal of the channel ch2 by subtracting a result of the weighting from the signal of the channel ch2 by the subtraction units 351 and 352 illustrated in FIG. 3.

The crosstalk compensation in the process stage 404 may be expressed by the following equation (4), for example. In this equation (4), E"(2x) and E"(2y) are X and Y polarized signals of the channel ch2 after the crosstalk compensation, respectively. W1xx, W1yx, W1xy, W1yy, W3xx, W3yx, W3xy, and W3yy are the respective coefficients in the multiplication units 331 to 338 illustrated in FIG. 3. E'(1x) and E'(1y) are X and Y polarized signals included in E'(1) shown in the above equation (1), respectively. E'(2x) and E'(2y) are X and Y polarized signals included in E'(2) shown in the above equation (2). E'(3x) and E'(3y) are X and Y polarized signals included in E'(3) shown in the above equation (3).

$$\begin{bmatrix} E''(2x) \\ E''(2y) \end{bmatrix} = \begin{bmatrix} -W1xx & -W1yx & 1 & 0 & -W3xx & -W3yx \\ -W1xy & -W1yy & 0 & 1 & -W3xy & -W3yy \end{bmatrix} \begin{bmatrix} E'(1x) \\ E'(1y) \\ E'(2x) \\ E'(2y) \\ E'(3x) \\ E'(3y) \end{bmatrix} \quad (4)$$

(Another Example of Crosstalk Compensation Unit (ch1) According to First Embodiment)

Figure 5:
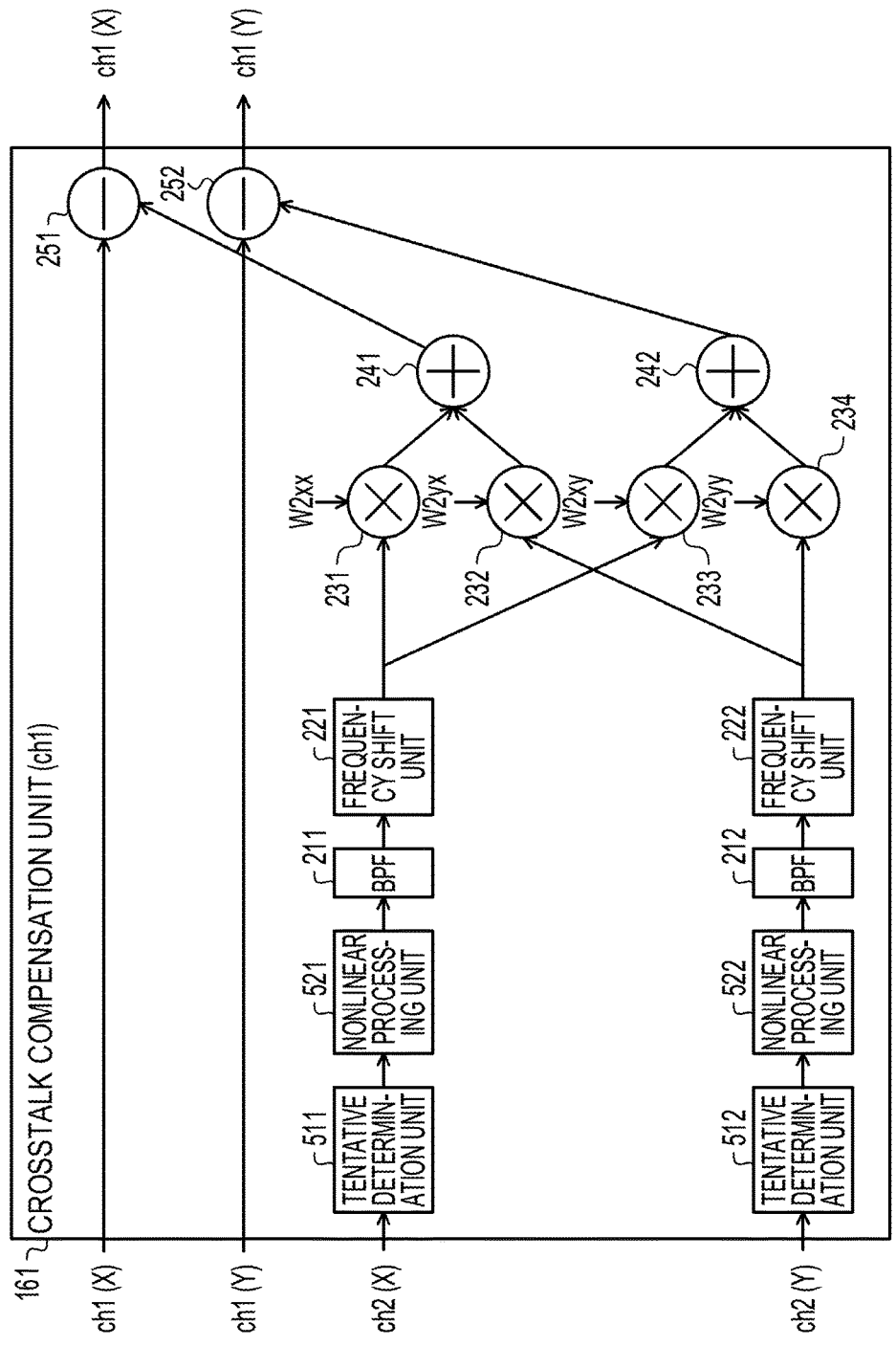
FIG. 5 is a view illustrating another example of the crosstalk compensation unit (ch1) according to the first embodiment.

FIG. 5 is a view illustrating another example of the crosstalk compensation unit (ch1) according to the first embodiment. In FIG. 5, the same parts and units as in FIG. 2 are denoted by the same reference numerals, and explanation of which will not be repeated. As illustrated in FIG. 5, in addition to the configuration illustrated in FIG. 2, the crosstalk compensation unit 161 may include tentative determination units 511 and 512 and nonlinear processing units 521 and 522.

The X polarized signal of the channel ch2 output from the delay compensation unit 152 illustrated in FIG. 1 is input to the tentative determination unit 511. The tentative determination unit 511 performs a tentative determination (e.g., tentative decoding) of the input X polarized signal of the channel ch2. The signal tentative determination may be performed, for example, by determining a symbol corresponding to a combination of phase and amplitude of the signal. The tentative determination unit 511 outputs the tentatively determined signal to the nonlinear processing unit 521.

The Y polarized signal of the channel ch2 output from the delay compensation unit 152 illustrated in FIG. 1 is input to the tentative determination unit 512. The tentative determination unit 512 performs a tentative determination of the input Y polarized signal of the channel ch2 and outputs the tentatively determined signal to the nonlinear processing unit 522.

The nonlinear processing unit 521 performs filtering to give a predetermined nonlinear distortion to the signal output from the tentative determination unit 511. The predetermined nonlinear distortion given to the signal by the nonlinear processing unit 521 is a nonlinear distortion given to the X polarized signal of the channel ch2 by the transmitting device that transmits the signal light 101 to the receiving device 100. The predetermined nonlinear distortion may be obtained, for example, by calculation based on the design of the transmitting device, actual measurement using the transmitting device, or the like. The nonlinear processing unit 521 outputs the filtered signal to the BPF 211.

The nonlinear processing unit 522 performs filtering to give a predetermined nonlinear distortion to the signal output from the tentative determination unit 512. The predetermined nonlinear distortion given to the signal by the nonlinear processing unit 522 is a nonlinear distortion given to the Y polarized signal of the channel ch2 by the transmitting device that transmits the signal light 101 to the receiving device 100. The nonlinear processing unit 522 outputs the filtered signal to the BPF 212.

The BPF 211 extracts a signal component to become a crosstalk with respect to the signal of the channel ch1, out of the signal output from the nonlinear processing unit 521. The BPF 212 extracts a signal component to become a crosstalk with respect to the signal of the channel ch1, out of the signal output from the nonlinear processing unit 522.

(Another Example of Crosstalk Compensation Unit (ch2) According to First Embodiment)

Figure 6:
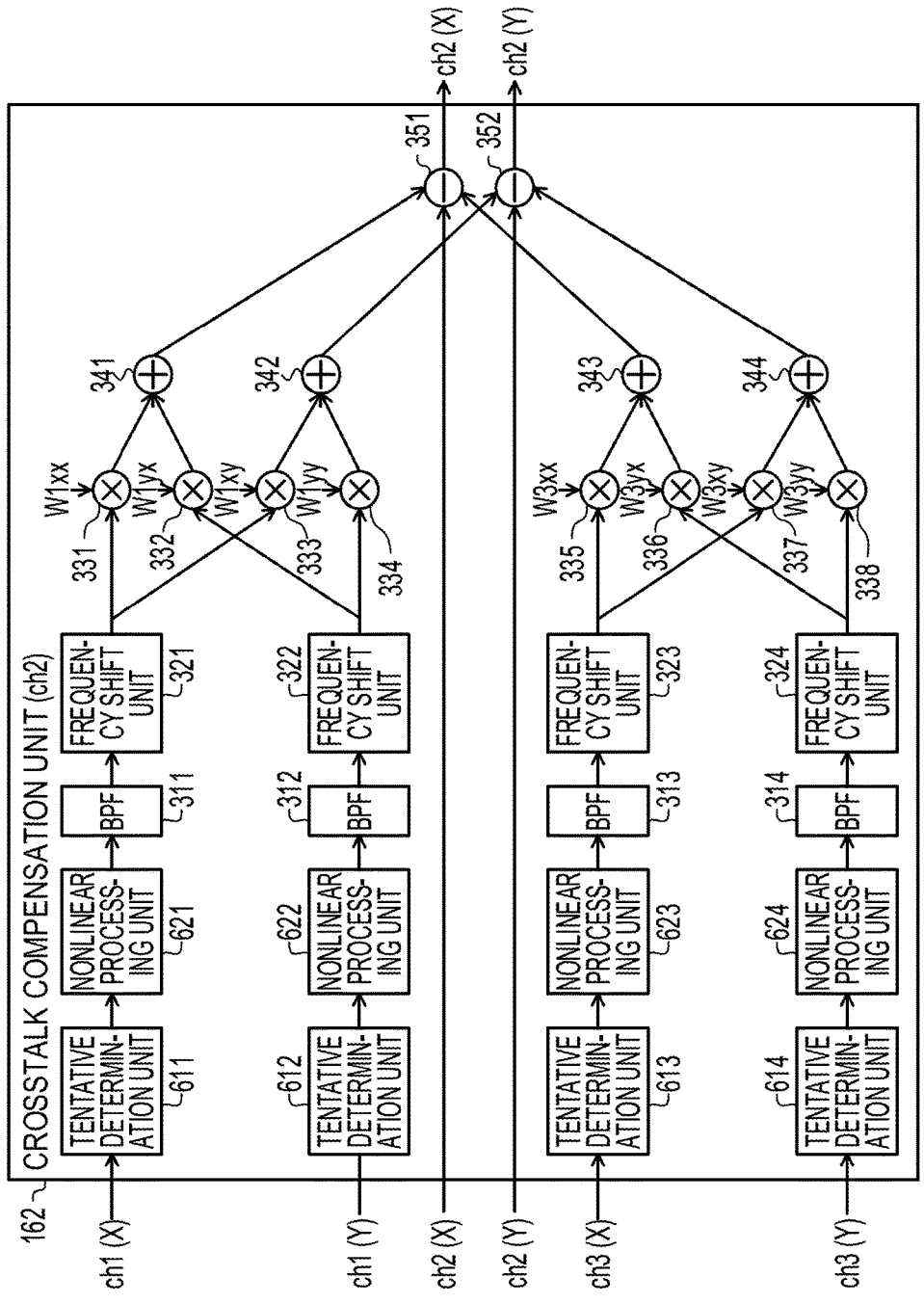
FIG. 6 is a view illustrating another example of the crosstalk compensation unit (ch2) according to the first embodiment.

FIG. 6 is a view illustrating another example of the crosstalk compensation unit (ch2) according to the first embodiment. In FIG. 6, the same parts and units as in FIG. 3 are denoted by the same reference numerals, and explanation of which will not be repeated. As illustrated in FIG. 6, in addition to the configuration illustrated in FIG. 3, the crosstalk compensation unit 162 may include tentative determination units 611 to 614 and nonlinear processing units 621 to 624.

The X polarized signal of the channel ch1 output from the delay compensation unit 151 illustrated in FIG. 1 is input to the tentative determination unit 611. The tentative determination unit 611 performs a tentative determination of the input X polarized signal of the channel ch1 and outputs the tentatively determined signal to the nonlinear processing unit 621. The Y polarized signal of the channel ch1 output from the delay compensation unit 151 illustrated in FIG. 1 is input to the tentative determination unit 612. The tentative determination unit 612 performs a tentative determination of the Y polarized signal of the channel ch1 which is input and outputs the tentatively determined signal to the nonlinear processing unit 622.

The nonlinear processing unit 621 performs filtering to give a predetermined nonlinear distortion to the signal output from the tentative determination unit 611. The predetermined nonlinear distortion given to the signal by the nonlinear processing unit 621 is a nonlinear distortion given to the X polarized signal of the channel ch1 by the transmitting device that transmits the signal light 101 to the receiving device 100. The nonlinear processing unit 621 outputs the filtered signal to the BPF 311. The nonlinear processing unit 622 performs filtering to give a predetermined nonlinear distortion to the signal output from the tentative determination unit 612. The predetermined nonlinear distortion given to the signal by the nonlinear processing unit 622 is a nonlinear distortion given to the Y polarized signal of the channel ch1 by the transmitting device that transmits the signal light 101 to the receiving device 100. The nonlinear processing unit 622 outputs the filtered signal to the BPF 312.

The BPF 311 extracts a signal component to become a crosstalk with respect to the signal of the channel ch2, out of the signal output from the nonlinear processing unit 621. The BPF 312 extracts a signal component to become a crosstalk with respect to the signal of the channel ch2, out of the signal output from the nonlinear processing unit 622.

The X polarized signal of the channel ch3 output from the delay compensation unit 153 illustrated in FIG. 1 is input to the tentative determination unit 613. The tentative determination unit 613 performs a tentative determination of the X polarized signal of the channel ch3 which is input and outputs the tentatively determined signal to the nonlinear processing unit 623. The Y polarized signal of the channel ch3 output from the delay compensation unit 153 illustrated in FIG. 1 is input to the tentative determination unit 614. The tentative determination unit 614 performs tentative determination of the Y polarized signal of the channel ch3 which is input and outputs the tentatively determined signal to the nonlinear processing unit 624.

The nonlinear processing unit 623 performs filtering to give a predetermined nonlinear distortion to the signal output from the tentative determination unit 613. The predetermined nonlinear distortion given to the signal by the nonlinear processing unit 623 is a nonlinear distortion given to the X polarized signal of the channel ch3 by the transmitting device that transmits the signal light 101 to the receiving device 100. The nonlinear processing unit 623 outputs the filtered signal to the BPF 313. The nonlinear processing unit 624 performs filtering to give a predetermined nonlinear distortion to the signal output from the tentative determination unit 614. The predetermined nonlinear distortion given to the signal by the nonlinear processing unit 624 is a nonlinear distortion given to the Y polarized signal of the channel ch3 by the transmitting device that transmits the signal light 101 to the receiving device 100. The nonlinear processing unit 624 outputs the filtered signal to the BPF 314.

The BPF 313 extracts a signal component to become a crosstalk with respect to the signal of the channel ch2, out of the signal output from the nonlinear processing unit 623. The BPF 314 extracts a signal component to become a crosstalk with respect to the signal of the channel ch2, out of the signal output from the nonlinear processing unit 624.

(Another Example of Crosstalk Compensation Unit (ch3) According to First Embodiment)

Another example of the crosstalk compensation unit 163 that compensates for the crosstalk from the channel ch2 for each signal of the channel ch3 is the same as the example of the crosstalk compensation unit 161 that compensates for the crosstalk from the channel ch2 for each signal of the channel ch1 (see FIG. 5).

In this manner, according to the receiving device 100 of the first embodiment, it is possible to frequency-shift a signal component of crosstalk from the second signal to the first signal, which is extracted from a signal obtained by demodulation of the second signal. Then, it is possible to compensate for a crosstalk for a signal obtained by demodulation of the first signal, based on the frequency-shifted signal component.

This makes it possible to narrow the band of a signal input to a circuit that compensates for a crosstalk by MIMO processing, for example, so that a signal band (pass band) of the circuit that compensates for the crosstalk may be narrowed. Therefore, it is possible to compensate for the crosstalk while suppressing an increase in circuit scale.

Further, since it is possible to narrow the band of a signal input to a circuit that frequency-shifts a signal component of crosstalk, for example, it is possible to narrow the signal band (pass band) of the circuit that shifts the frequency of the crosstalk signal component. Therefore, it is possible to compensate for the crosstalk while suppressing an increase in circuit scale.

For example, the above-mentioned first signal and second signal are signals which are wavelength-multiplexed by frequencies adjacent to each other in the signal light. However, the first signal and the second signal are not limited to the respective signals wavelength-multiplexed by the frequencies adjacent to each other in the signal light but may have a relationship that a crosstalk from the second signal to the first signal occurs. Further, the first signal and the second signal may be signals wavelength-multiplexed in an electric stage or signals wavelength-multiplexed in an optical stage.

For example, the receiving device 100 frequency-shifts the extracted crosstalk signal component by an amount corresponding to a difference between the center frequencies of the first signal and the second signal in the signal light. This makes it possible to compensate for a crosstalk by combining the band of the crosstalk signal component in the signal obtained by demodulation of the first signal and the band of the extracted crosstalk signal component.

In addition, the receiving device 100 weights the frequency-shifted crosstalk signal component and performs a MIMO processing to compensate for the crosstalk based on the weighted crosstalk signal components. In this case, the receiving device 100 may output information indicating the amount of crosstalk from the second signal to the first signal based on the weighting coefficients for the crosstalk signal component in the crosstalk compensation (MIMO processing). This makes it possible to monitor the crosstalk amount using a circuit that compensates for the crosstalk.

In addition, the receiving device 100 may determine a signal obtained by demodulation of the second signal, give a nonlinear distortion to a signal obtained by the determination, and extract a crosstalk signal component from the signal given the nonlinear distortion. For example, the receiving device 100 gives the signal a nonlinear distortion given to the second signal by the transmitting device that transmits the second signal. This makes it possible to accurately extract a crosstalk signal component corresponding to a nonlinear distortion on the transmission side of the signal light and hence accurately compensate for the crosstalk.

Second Embodiment

Next, a second embodiment will be described with emphasis placed on parts different from those in the first embodiment. The second embodiment addresses a case where the receiving device 100 receives an optical signal of Nyquist frequency division multiplexing (NFDM). NFDM is, for example, a method of Nyquist-pulsing a signal of a symbol rate of several Gbaud and electrically multiplexing the signal.

(Communication System According to Second Embodiment)

Figure 7:
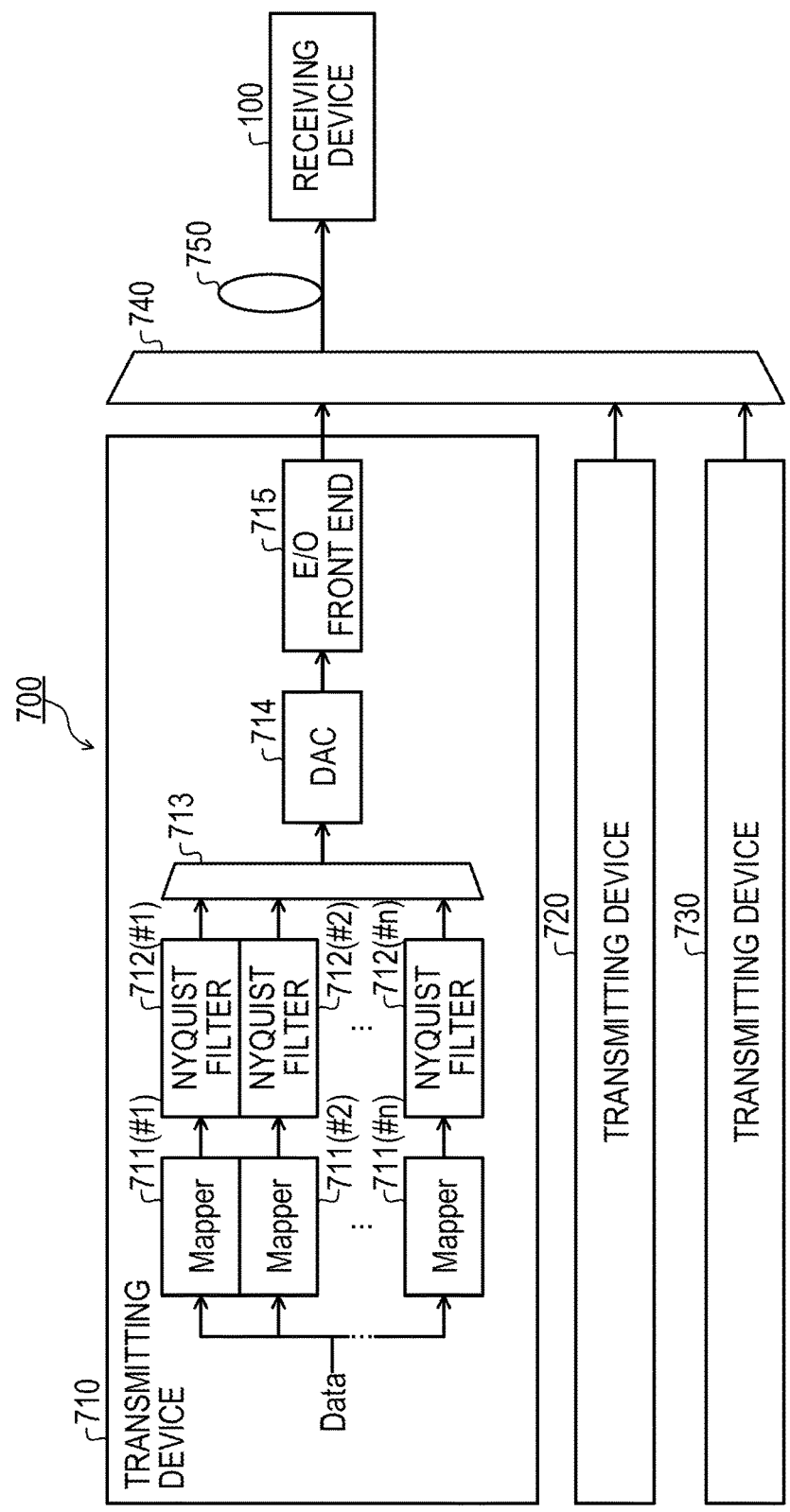
FIG. 7 is a view illustrating an example of a communication system according to a second embodiment.

FIG. 7 is a view illustrating an example of a communication system according to the second embodiment. In FIG. 7, the same parts and units as in FIG. 1 are denoted by the same reference numerals, and explanation of which will not be repeated. Referring to FIG. 7, a communication system 700 according to the second embodiment may include transmitting devices 710, 720 and 730, an optical multiplexing unit 740, an optical transmission path 750, and a receiving device 100.

The transmitting device 710 generates and transmits an optical signal. For example, the transmitting device 710 includes mappers 711 (#1 to #n), Nyquist filters 712 (#1 to #n), an electrical multiplexing unit (MUX) 713, a DAC 714, and an E/O front end 715. DAC is an acronym for digital/analog converter. n represents the number of subcarriers included in the optical signal transmitted by the transmitting device 710.

Data to be transmitted to the receiving device 100 is input to the mappers 711 (#1 to #n). Each of the mappers 711 (#1 to #n) performs mapping of the input data to a signal. For example, each mapper 711 (#1 to #n) maps data to the amplitude and phase (symbol) of the signal. The mappers 711 (#1 to #n) output the signals obtained by the mapping to the Nyquist filters 712 (#1 to #n), respectively.

The Nyquist filters 712 (#1 to #n) Nyquist-pulses the signals output from the mappers 711 (#1 to #n), respectively, by filtering. A Nyquist pulse is a pulse which satisfies, for example, the Nyquist conditions (zero crossing at equally spaced intervals except peak). The Nyquist filters 712 (#1 to #n) output the respective Nyquist-pulsed signals to the electric multiplexing unit 713.

The electrical multiplexing unit 713 electrically wavelength-multiplexes the signals (Nyquist pulses) output from the Nyquist filters 712 (#1 to #n). For example, the electrical multiplexing unit 713 performs wavelength multiplexing by setting the frequencies of the signals to different frequencies and combining the signals (subcarriers) having the set frequencies. Then, the electrical multiplexing unit 713 outputs a signal obtained by the wavelength multiplexing to the DAC 714.

The mappers 711 (#1 to #n), the Nyquist filters 712 (#1 to #n), and the electrical multiplexing unit 713 may be implemented by a hardware processor such as DSP or FPGA.

The DAC 714 converts the signal output from the electric multiplexing unit 713 from a digital signal to an analog signal which is then output to the E/O front end 715. The E/O front end 715 converts the signal output from the DAC 714 from an electrical signal to an optical signal. Then, the E/O front end 715 transmits the optical signal obtained by the conversion to the optical multiplexing unit 740. The E/O front end 715 may be implemented by, for example, a light source such as a laser diode (LD) and its driving circuit.

The transmitting device 720 generates an optical signal of a frequency band different from that of the transmitting device 710 and transmits the generated optical signal to the optical multiplexing unit 740. The transmitting device 720 has the same configuration as the transmitting device 710, for example. The transmitting device 730 generates an optical signal of a frequency band different from those of the transmitting devices 710 and 720, and transmits the generated optical signal to the optical multiplexing unit 740. The transmitting device 730 has, for example, the same configuration as the transmitting device 710.

The optical multiplexing unit 740 wavelength-multiplexes the optical signals having different frequency bands transmitted from the transmitting devices 710, 720, and 730. Then, the optical multiplexing unit 740 transmits a signal light obtained by the wavelength multiplexing to the receiving device 100 via the optical transmission line 750.

The optical transmission line 750 is, for example, an optical fiber such as SSMF. SSMF is an acronym for standard single mode fiber (standard type optical fiber). Further, the optical transmission line 750 may include an optical repeater such as an amplifier. The receiving device 100 receives the signal light transmitted from the optical multiplexing unit 740 via the optical transmission line 750.

(Nyquist Waveform in Case Where Nonlinear Distortion in Transmitting Device According to Second Embodiment is Small)

Figure 8:
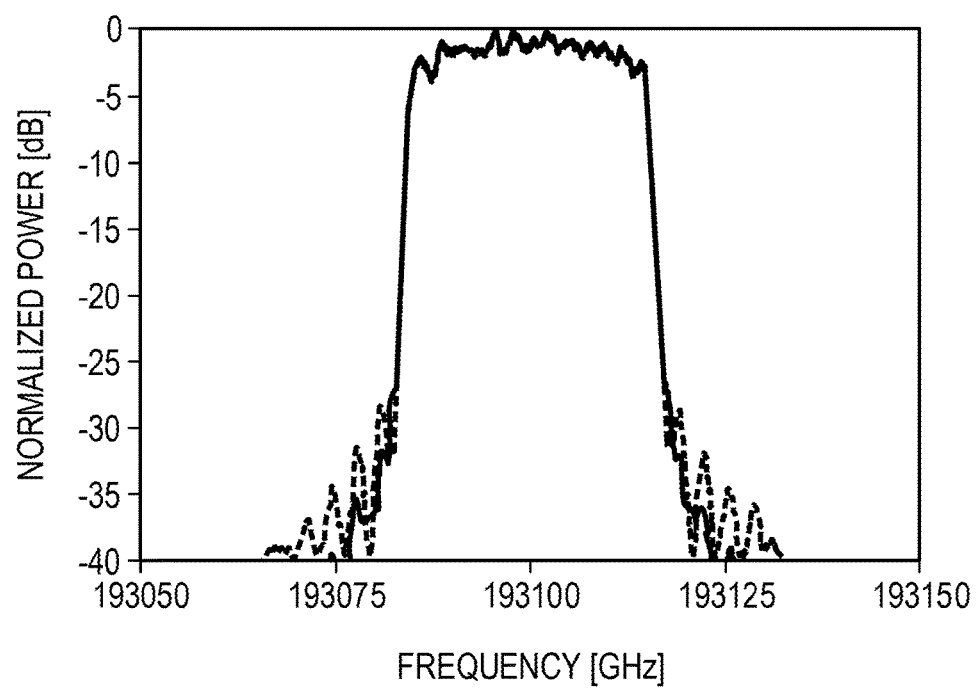
FIG. 8 is a view illustrating an example of a Nyquist waveform in a case where nonlinear distortion in a transmitting device according to the second embodiment is small.

FIG. 8 is a view illustrating an example of a Nyquist waveform in a case where a nonlinear distortion in the transmitting device according to the second embodiment is small. In FIG. 8, the horizontal axis represents a frequency [GHz] and the vertical axis represents normalized power [dB]. Nyquist waveforms 801 and 802 illustrated in FIG. 8 indicate the frequency spectra of subcarriers included in the optical signal transmitted from the transmitting device 710 in a case where the nonlinear distortion in the transmitting device 710 is relatively small.

The Nyquist waveform 801 is the frequency spectrum of the optical signal in a case where nonlinear response compensation by signal processing is performed (with nonlinear response compensation). The Nyquist waveform 802 is the frequency spectrum of the optical signal in a case where nonlinear response compensation by signal processing is not performed (without nonlinear response compensation). As illustrated in FIG. 8, when the nonlinear distortion in the transmitting device 710 is relatively small, the distortion of the Nyquist waveform is small and may be suppressed by the nonlinear response compensation by signal processing.

(Nyquist Waveform in Case where Nonlinear Distortion in Transmitting Device According to Second Embodiment is Large)

Figure 9:
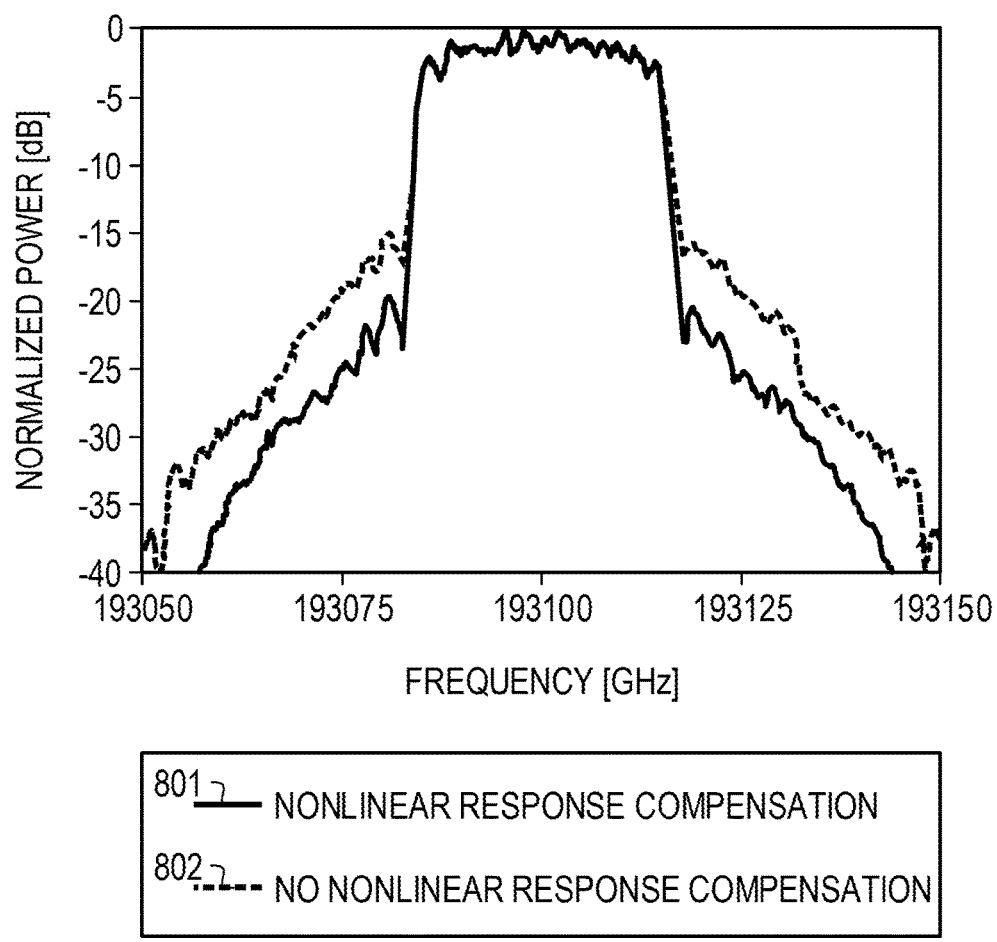
FIG. 9 is a view illustrating an example of a Nyquist waveform in a case where the nonlinear distortion in the transmitting device according to the second embodiment is large.

FIG. 9 is a view illustrating an example of a Nyquist waveform in a case where a nonlinear distortion in the transmitting device according to the second embodiment is large. In FIG. 9, the same portions as in FIG. 8 are denoted by the same reference numerals, and explanation of which will not be repeated. Nyquist waveforms 801 and 802 illustrated in FIG. 9 indicate the frequency spectra of subcarriers included in the optical signal transmitted from the transmitting device 710 in a case where the nonlinear distortion in the transmitting device 710 is relatively large.

As illustrated in FIG. 9, when the nonlinear distortion in the transmitting device 710 is relatively large, the distortion of the Nyquist waveform is large and may be suppressed, but hardly completely, by the nonlinear response compensation by signal processing. Therefore, leakage of signal components outside the signal band increases and a crosstalk to other channels increases. Further, if the wavelength spacing between the channels is increased in order to suppress the crosstalk, the frequency utilization efficiency decreases.

In contrast, the receiving device 100 may compensate for the generated crosstalk, so that, even when the nonlinear distortion in the transmitting device 710 is large, it is possible to suppress deterioration of reception quality due to the crosstalk.

Although the optical signal transmitted by the transmitting device 710 has been illustrated in FIGS. 8 and 9, the same applies to the optical signals transmitted by the transmitting devices 720 and 730.

(Signal Light Received by Receiving Device According to Second Embodiment)

Figure 10:
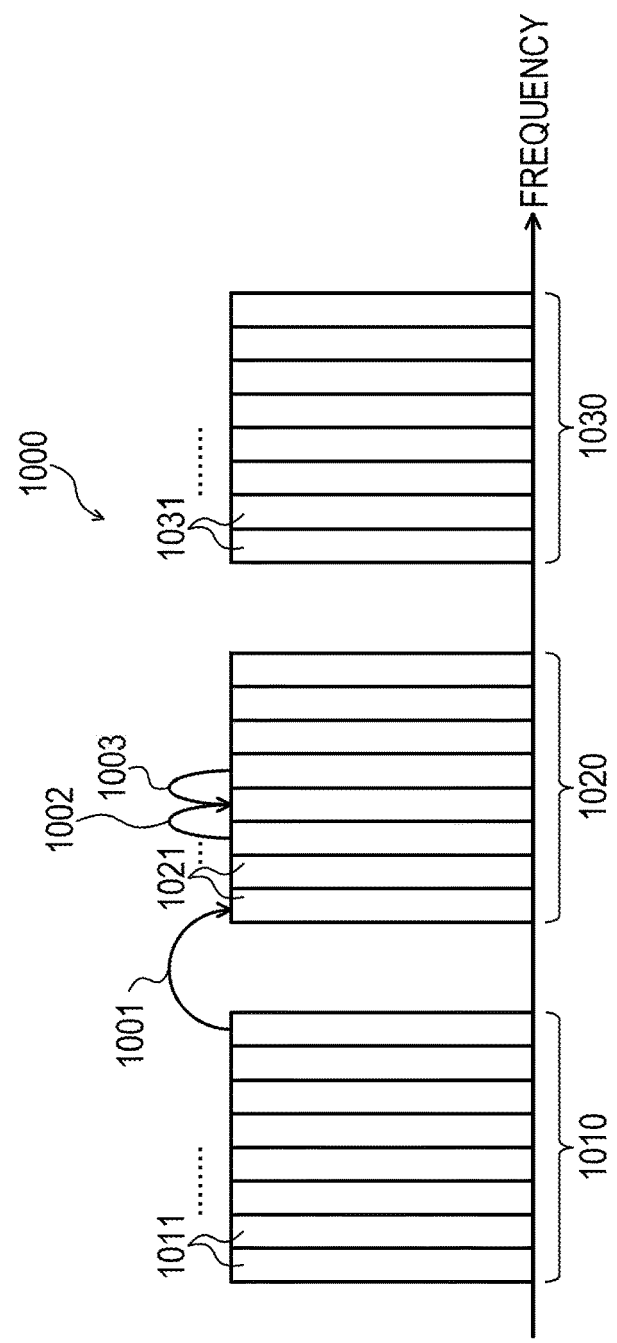
FIG. 10 is a view illustrating an example of signal light received by a receiving device according to the second embodiment.

FIG. 10 is a view illustrating an example of signal light received by the receiving device according to the second embodiment. In FIG. 10, the horizontal axis represents a frequency and the vertical direction represents signal strength. The receiving device 100 illustrated in FIG. 7 receives, for example, signal light 1000 illustrated in FIG. 10. The signal light 1000 includes optical signals 1010, 1020, and 1030. The optical signal 1010 is an optical signal transmitted by the transmitting device 710 illustrated in FIG. 7. The optical signal 1010 includes a plurality of Nyquist pulsed subcarriers 1011.

The optical signal 1020 is an optical signal transmitted by the transmitting device 720 illustrated in FIG. 7. The frequency band of the optical signal 1020 is set on the higher frequency side than the frequency band of the optical signal 1010. The optical signal 1020 includes a plurality of Nyquist pulsed subcarriers 1021. The optical signal 1030 is an optical signal transmitted by the transmitting device 730 illustrated in FIG. 7. The frequency band of the optical signal 1030 is set to the higher frequency side than the frequency bands of the optical signals 1010 and 1020. The optical signal 1030 includes a plurality of Nyquist pulsed subcarriers 1031.

In the signal light 1000, a crosstalk between the subcarriers in the optical signals or a crosstalk between the optical signals occurs due to, for example, nonlinear distortions in the transmitting devices 710, 720, and 730. For example, an inter-optical signal crosstalk 1001 illustrated in FIG. 10 is a crosstalk in which a signal component of the highest frequency subcarrier of the optical signal 1010 leaks into a signal component of the lowest frequency subcarrier of the optical signal 1020. In addition, inter-subcarrier crosstalks 1002 and 1003 illustrated in FIG. 10 are crosstalks in which signal components of subcarriers leak into signal components of adjacent subcarriers in the optical signal 1020.

The receiving device 100 compensates for at least one of the crosstalk between the subcarriers in the optical signal and the crosstalk between the optical signals.

Figure 11:
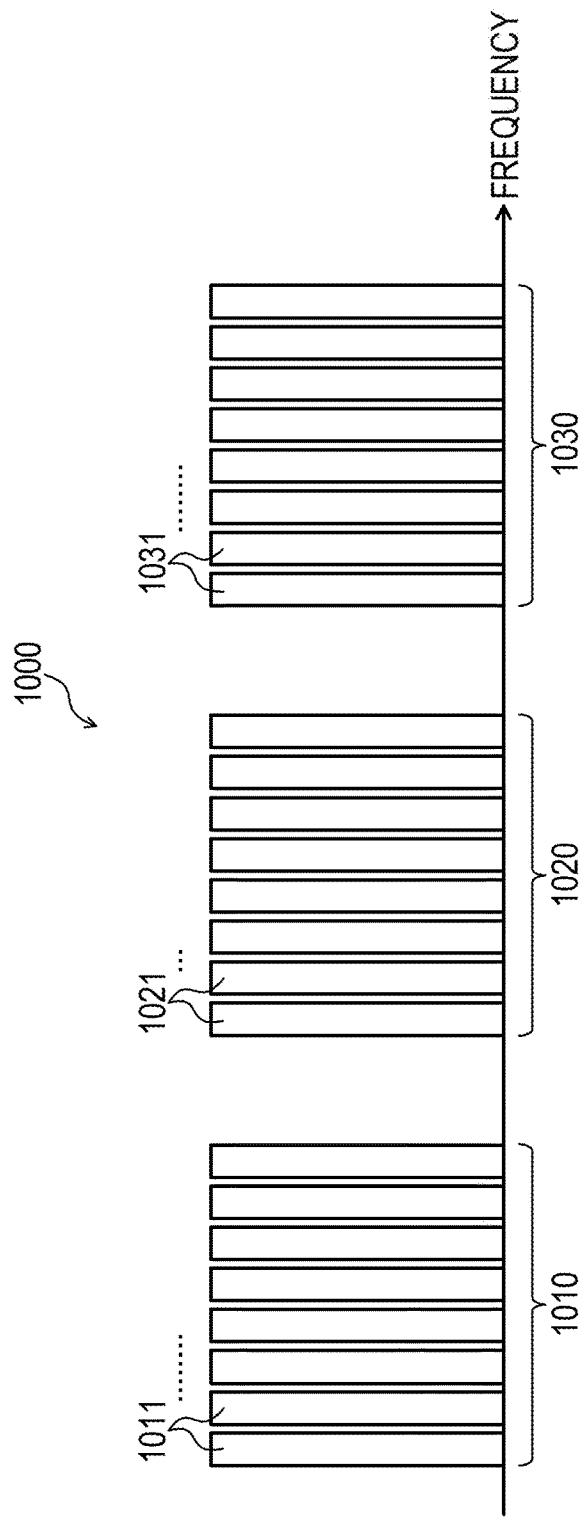
FIG. 11 is a view illustrating another example of the signal light received by the receiving device according to the second embodiment.

FIG. 11 is a view illustrating another example of the signal light received by the receiving device according to the second embodiment. In FIG. 11, the same portions as in FIG. 10 are denoted by the same reference numerals, and explanation of which will not be repeated. As illustrated in FIG. 11, if the spacing between the optical signals 1010, 1020, and 1030 and the spacing between the subcarriers in these optical signals are increased, a crosstalk may be suppressed. However, this requires a wider frequency band, resulting in deterioration of frequency use efficiency.

In contrast, the receiving device 100 may compensate for the crosstalk between the subcarriers in the optical signals and the crosstalk between the optical signals, so that, even when the spacing between the optical signals and the spacing between the subcarriers are not increased, it is possible to suppress deterioration of reception performance.

(Receiving Device according to Second Embodiment)

Figure 12:
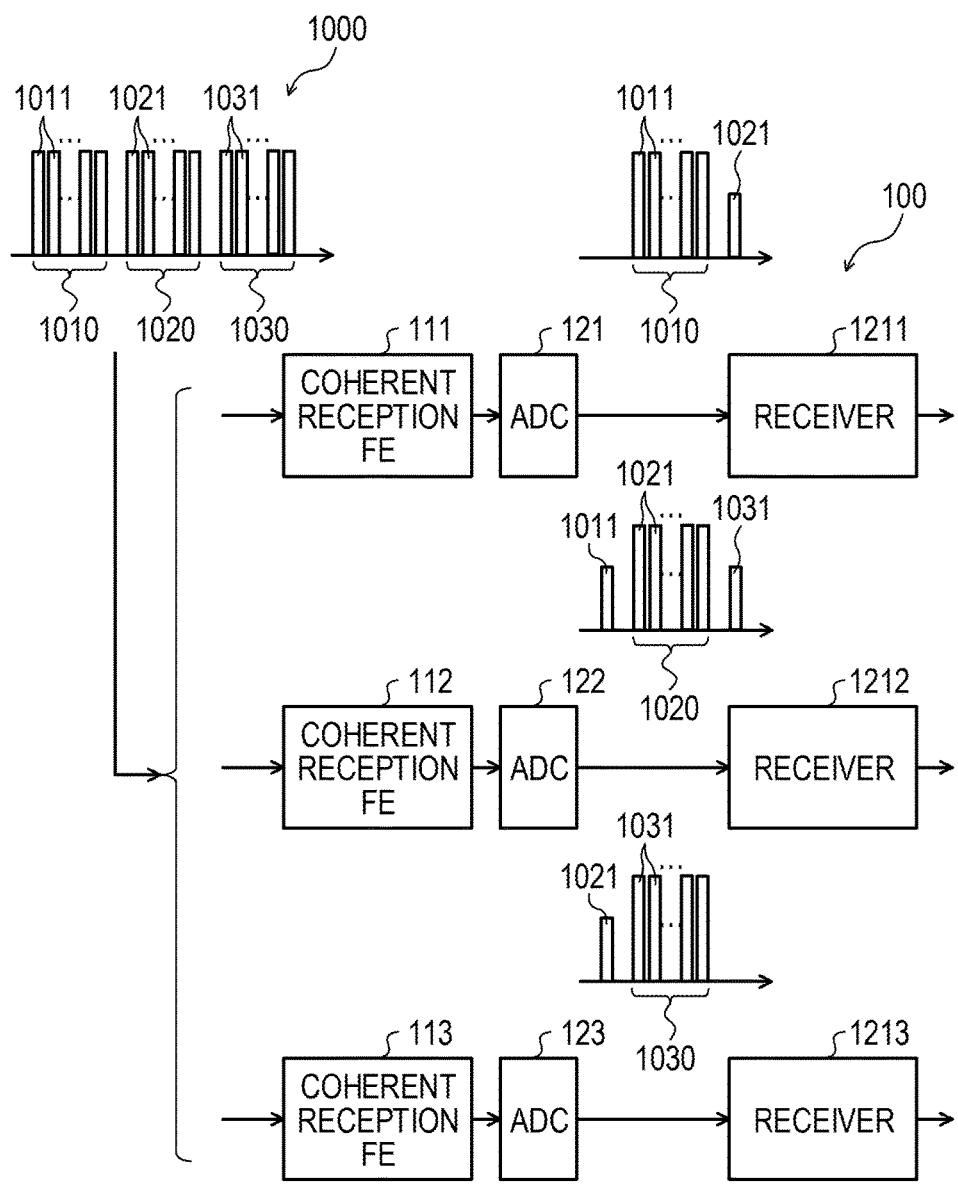
FIG. 12 is a view illustrating an example of the receiving device according to the second embodiment.

FIG. 12 is a view illustrating an example of the receiving device according to the second embodiment. In FIG. 12, the same parts and units as in FIG. 1 or FIG. 10 are denoted by the same reference numerals, and explanation of which will not be repeated. Referring to FIG. 12, the receiving device 100 may include coherent receiving FEs 111 to 113, ADCs 121 to 123, and receiving units 1211 to 1213.

In the example illustrated in FIG. 12, the receiving device 100 receives the signal light 1000 including the optical signals 1010, 1020, and 1030 illustrated in FIG. 10. In the example illustrated in FIG. 12, the optical signals 1010, 1020, and 1030 are assumed as channels ch1 to ch3, respectively.

The coherent receiving FE 111 coherently receives the optical signal 1010 (channel ch1) and a portion of subcarriers of the optical signal 1020. Such coherent reception may be implemented by using the local light emission having the same center frequency as the optical signal 1010 for the local light emission of the coherent receiving FE 111 and by designing the band of the coherent receiving FE 111 wider than the band of the optical signal 1010. A portion of subcarriers of the optical signal 1020 coherently received by the coherent receiving FE 111 are, for example, subcarriers having a frequency closest (lowest frequency side) to the frequency of the optical signal 1010, among the subcarriers 1021.

The coherent receiving FE 112 coherently receives the optical signal 1020 (channel ch2), a portion of subcarriers of the optical signal 1010, and a portion of subcarriers of the optical signal 1030. Such coherent reception may be implemented by using the local light emission having the same center frequency as the optical signal 1020 for the local light emission of the coherent receiving FE 112 and by designing the band of the coherent receiving FE 112 wider than the band of the optical signal 1020. A portion of subcarriers of the optical signal 1010 coherently received by the coherent receiving FE 112 are, for example, subcarriers having a frequency closest (highest frequency side) to the frequency of the optical signal 1020, among the subcarriers 1011 of the optical signal 1010. A portion of subcarriers of the optical signal 1030 coherently received by the coherent receiving FE 112 are, for example, subcarriers having a frequency closest (lowest frequency side) to the frequency of the optical signal 1020, among the subcarriers 1031 of the optical signal 1030.

The coherent receiving FE 113 coherently receives the optical signal 1030 (channel ch3) and a portion of subcarriers of the optical signal 1020. Such coherent reception may be implemented by using the local light emission having the same center frequency as the optical signal 1030 for the local light emission of the coherent receiving FE 113 and by designing the band of the coherent receiving FE 113 wider than the band of the optical signal 1030. A portion of subcarriers of the optical signal 1020 coherently received by the coherent receiving FE 113 are, for example, subcarriers having a frequency closest (highest frequency side) to the frequency of the optical signal 1030, among the subcarriers 1021.

The receiving unit 1211 performs a process of receiving the optical signal 1010 (channel ch1) based on a signal coherently received by the coherent receiving FE 111 and converted from analog to digital by the ADC 121. A signal input to the receiving unit 1211 includes the optical signal 1010 and a portion of subcarriers 1021 of the optical signal 1020 adjacent to the optical signal 1010. The receiving unit 1211 outputs the signal of the channel ch1 obtained by the reception process.

The receiving unit 1212 performs a process of receiving the optical signal 1020 (channel ch2) based on a signal coherently received by the coherent receiving FE 112 and converted from analog to digital by the ADC 122. A signal input to the receiving unit 1212 includes the optical signal 1020, a portion of subcarriers 1011 of the optical signal 1010 adjacent to the optical signal 1020, and a portion of subcarriers 1031 of the optical signal 1030 adjacent to the optical signal 1020. The receiving unit 1212 outputs the signal of the channel ch2 obtained by the reception process.

The receiving unit 1213 performs a process of receiving the optical signal 1030 (channel ch3) based on a signal coherently received by the coherent receiving FE 113 and converted from analog to digital by the ADC 123. A signal input to the receiving unit 1213 includes the optical signal 1030 and a portion of subcarriers 1021 of the optical signal 1020 adjacent to the optical signal 1030. The receiving unit 1213 outputs the signal of the channel ch3 obtained by the reception process.

The receiving units 1211 to 1213 illustrated in FIG. 12 may be implemented by, for example, a hardware processor such as DSP or FPGA. In addition, the receiving device 100 may include a decoding unit that performs decoding by determining each signal output from the receiving units 1211 to 1213. This decoding unit may also be implemented by digital circuits such as the above-mentioned DSP and FPGA.

(Receiving Unit (ch1) of Receiving Device According to Second Embodiment)

Figure 13:
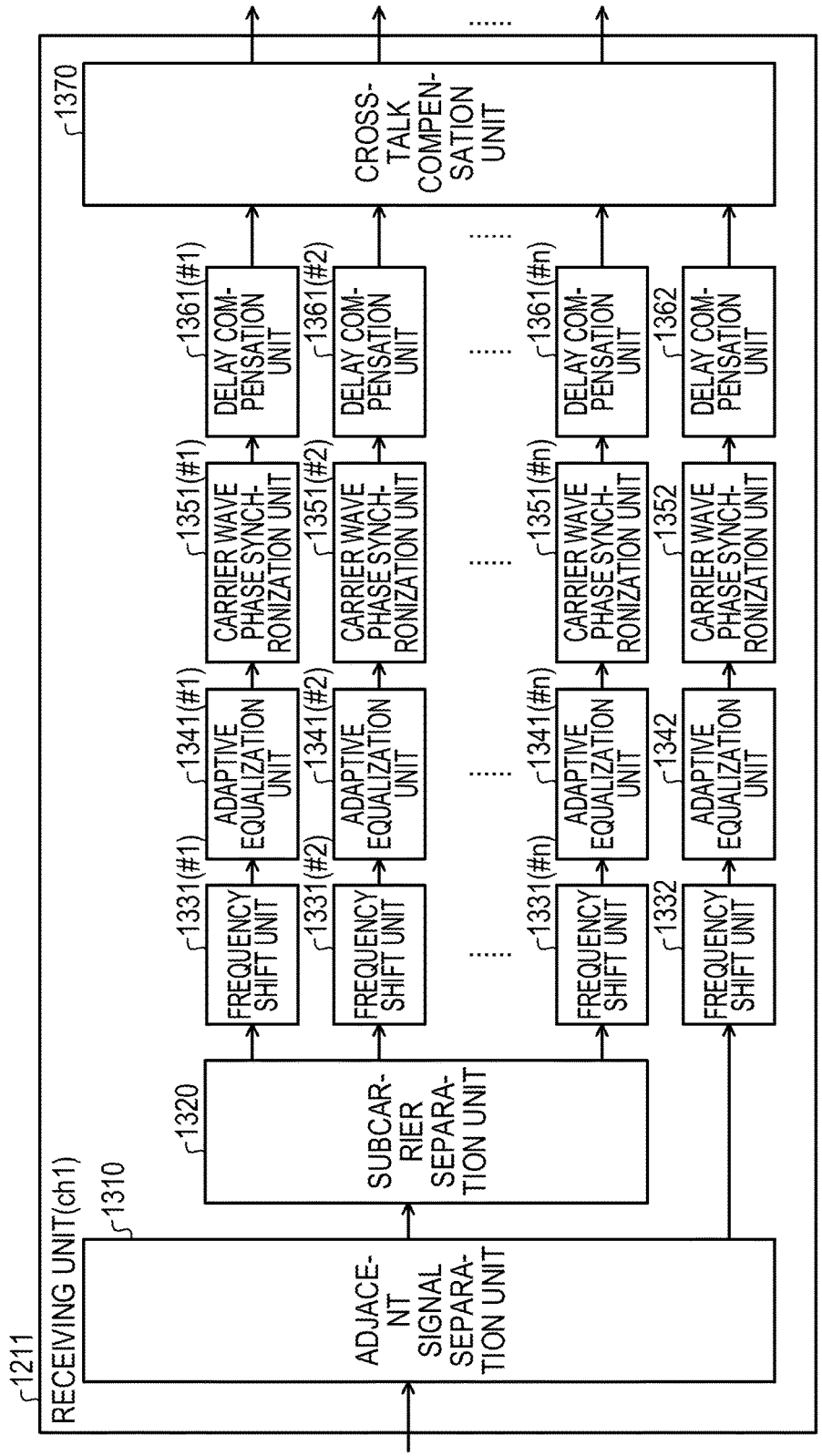
FIG. 13 is a view illustrating an example of a receiving unit (ch1) of the receiving device according to the second embodiment.

FIG. 13 is a view illustrating an example of the receiving unit (ch1) of the receiving device according to the second embodiment. Referring to FIG. 13, the receiving unit 1211 that performs the process of receiving the optical signal 1010 (channel ch1) may include an adjacent signal separation unit 1310, a subcarrier separation unit 1320, and frequency shift units 1331 (#1 to #n) and 1332. The receiving unit 1211 may further include adaptive equalization units 1341 (#1 to #n) and 1342, carrier wave phase synchronization units 1351 (#1 to #n) and 1352, delay compensation units 1361 (#1 to #n) and 1362, and a crosstalk compensation unit 1370. The symbol n represents the number of subcarriers included in the optical signal 1010.

The signal output from the ADC 121 illustrated in FIG. 12 is input to the adjacent signal separation unit 1310. This signal includes the optical signal 1010 and a portion of subcarriers 1021 of the optical signal 1020 adjacent to the optical signal 1010. The adjacent signal separation unit 1310 separates the subcarriers 1021 of the optical signal 1020 from the input signal.

For example, the adjacent signal separation unit 1310 uses a training sequence (TS) included in the optical signal 1020 to estimate the frequency offset amount of the optical signal 1020. Then, the adjacent signal separation unit 1310 may separate the subcarriers 1021 of the optical signal 1020 by digital filtering processing based on the estimated frequency offset amount.

Then, the adjacent signal separation unit 1310 outputs the separated subcarriers 1021 of the optical signal 1020 to the frequency shift unit 1332. Further, the adjacent signal separation unit 1310 outputs the input signal to the subcarrier separation unit 1320. In addition, the adjacent signal separation unit 1310 may perform a process of compensating for the frequency offset of the subcarriers 1021 of the optical signal 1020 based on the estimated frequency offset amount.

The subcarrier separation unit 1320 separates n subcarriers (subcarriers 1011) of the optical signal 1010 included in the signal output from the adjacent signal separation unit 1310. For example, the subcarrier separation unit 1320 uses the training sequence (TS) included in the optical signal 1010 to estimate the frequency offset amount of the optical signal 1010. Then, the subcarrier separation unit 1320 separates the n subcarriers of the optical signal 1010 by performing digital filtering processing based on the estimated frequency offset amount.

Then, the subcarrier separation unit 1320 outputs the separated n subcarriers to the frequency shift units 1331 (#1 to #n), respectively. Further, the subcarrier separation unit 1320 may perform a process of compensating the frequency offset of each subcarrier of the optical signal 1010 based on the estimated frequency offset amount.

The n frequency shift units 1331 (#1 to #n) perform frequency shifting for the subcarriers output from the subcarrier separation unit 1320 so that the subcarriers become basebands. For example, the frequency shift units 1331 (#1 to #n) perform frequency shifting based on the frequency spacing of each signal (each subcarrier) set by the electrical multiplexing unit 713 of the transmitting device 710 illustrated in FIG. 7. Then, the frequency shift units 1331 (#1 to #n) output the frequency-shifted subcarriers to the adaptive equalization units 1341 (#1 to #n), respectively.

The frequency shift unit 1332 performs frequency shifting for the subcarriers output from the adjacent signal separation unit 1310 so that the subcarriers become basebands. For example, the frequency shift unit 1332 performs frequency shifting based on the spacing between the center frequency of the optical signal 1010 transmitted by the transmitting device 710 and the center frequency of a subcarrier on the lowest frequency side among the subcarriers 1021 of the optical signal 1020 transmitted by the transmitting device 720. Then, the frequency shift unit 1332 outputs the frequency-shifted subcarriers to the adaptive equalization unit 1342.

The n adaptive equalization units 1341 (#1 to #n) perform adaptive equalization processing on the subcarriers output from the frequency shift units 1331 (#1 to #n), respectively. As a result, an X polarized signal and a Y polarized signal included in each subcarrier of the optical signal 1010 are obtained. The adaptive equalization units 1341 (#1 to #n) output the obtained X polarized and Y polarized signals to the carrier wave phase synchronization units 1351 (#1 to #n), respectively.

Similarly, the adaptive equalization unit 1342 performs adaptive equalization processing on the subcarriers output from the frequency shift units 1332. As a result, an X polarized signal and a Y polarized signal included in a portion of subcarriers of the optical signal 1020 are obtained. The adaptive equalization unit 1342 outputs the obtained X polarized and Y polarized signals to the carrier wave phase synchronization unit 1352.

The n carrier wave phase synchronization units 1351 (#1 to #n) perform carrier wave phase synchronization processing on the X polarized and Y polarized signals output from the adaptive equalization units 1341 (#1 to #n), respectively. Then, the carrier wave phase synchronization units 1351 (#1 to #n) output the signals subjected to the carrier wave phase synchronization processing to the delay compensation units 1361 (#1 to #n), respectively.

Similarly, the carrier wave phase synchronization unit 1352 performs carrier wave phase synchronization processing on the X polarized and Y polarized signals output from the adaptive equalization unit 1342. Then, the carrier wave phase synchronization unit 1352 outputs the X polarized and Y polarized signals subjected to the carrier wave phase synchronization processing to the delay compensation unit 1362.

The n delay compensation units 1361 (#1 to #n) perform delay compensation on the X polarized and Y polarized signals output from the carrier wave phase synchronization units 1351 (#1 to #n), respectively, and output the delay-compensated signals to the crosstalk compensation unit 1370. As a result, the X polarized and Y polarized signals demodulated for each subcarrier of the optical signal 1010 are output to the crosstalk compensation unit 1370.

Similarly, the delay compensation unit 1362 performs a delay compensation on the X polarized and Y polarized signals output from the carrier wave phase synchronization unit 1352 and outputs the delay-compensated signals to the crosstalk compensation unit 1370. As a result, the X polarized and Y polarized signals demodulated for a portion of subcarriers of the optical signal 1020 are output to the crosstalk compensation unit 1370.

The crosstalk compensation unit 1370 compensates for a crosstalk to each signal (X polarized signal and Y polarized signal) of each subcarrier of the optical signal 1010 based on each signal output from the delay compensation units 1361 (#1 to #n) and 1362. Then, the crosstalk compensation unit 1370 outputs each signal of each subcarrier of the optical signal 1010 compensated for the crosstalk.

(Crosstalk Compensation Unit (ch1) of Receiving Device According to Second Embodiment)

Figure 14:
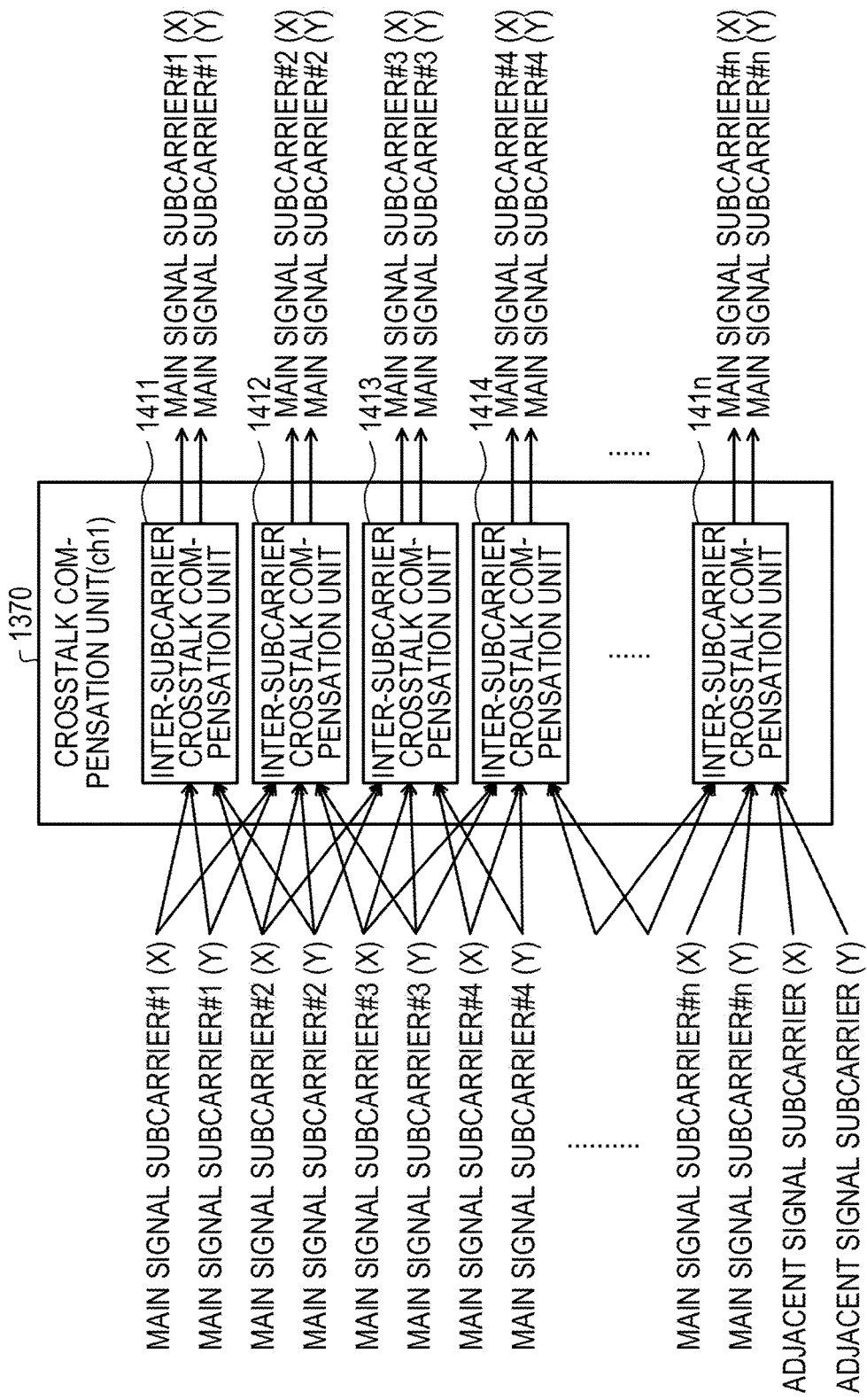
FIG. 14 is a view illustrating an example of a crosstalk compensation unit (ch1) of the receiving device according to the second embodiment.

FIG. 14 is a view illustrating an example of the crosstalk compensation unit (ch1) of the receiving device according to the second embodiment. Referring to FIG. 14, the crosstalk compensation unit 1370 may include n inter-subcarrier crosstalk compensation units 1411 to 141n. n represents the number of subcarriers included in the optical signal 1010.

For example, the inter-subcarrier crosstalk compensation unit 1411 receives each polarized signal (X polarized and Y polarized signals) of the first and second subcarriers #1 and #2 of the optical signal 1010 (main signal) from the delay compensation units 1361 (#1 and #2) illustrated in FIG. 13. The inter-subcarrier crosstalk compensation unit 1411 compensates for a crosstalk from each polarized signal of the subcarrier #2 to each polarized signal of the subcarrier #1 and outputs each polarized signal of the subcarrier #1 compensated for the crosstalk.

The inter-subcarrier crosstalk compensation unit 1412 receives each polarized signal of the first to third subcarriers #1 to #3 of the optical signal 1010 (main signal) from the delay compensation units 1361 (#1 to #3) illustrated in FIG. 13. The inter-subcarrier crosstalk compensation unit 1412 compensates for a crosstalk from each polarized signal of the subcarriers #1 and #3 to each polarized signal of the subcarrier #2 and outputs each polarized signal of the subcarrier #2 compensated for the crosstalk.

The inter-subcarrier crosstalk compensation unit 1413 receives each polarized signal of the second to fourth subcarriers #2 to #4 of the optical signal 1010 (main signal) from the delay compensation units 1361 (#2 to #4) illustrated in FIG. 13. The inter-subcarrier crosstalk compensation unit 1413 compensates for a crosstalk from each polarized signal of the subcarriers #2 and #4 to each polarized signal of the subcarrier #3 and outputs each polarized signal of the subcarrier #3 compensated for the crosstalk.

Similarly, the inter-subcarrier crosstalk compensation unit 141n receives each polarized signal of the $(n-1)^{th}$ and $n^{th}$ subcarriers #n-1 and #n of the optical signal 1010 (main signal) from the delay compensation units 1361 (#n-1 and #n) illustrated in FIG. 13. In addition, the inter-subcarrier crosstalk compensating unit 141n receives each polarized signal of a subcarrier having a frequency closest to the frequency of the optical signal 1010 among the subcarriers of the optical signal 1020 (adjacent signal) from the delay compensating unit 1362 illustrated in FIG. 13. The inter-subcarrier crosstalk compensation unit 1413 compensates for a crosstalk from the subcarrier #n-1 and the subcarrier of the optical signal 1020 to each polarized signal of the subcarrier #n and outputs each polarized signal of the subcarrier #n compensated for the crosstalk.

The inter-subcarrier crosstalk compensation unit 1411 illustrated in FIG. 14 may have the same configuration as the crosstalk compensation unit 161 illustrated in FIG. 2, for example. The inter-subcarrier crosstalk compensation units 1412 to 141n illustrated in FIG. 14 may have the same configuration, for example, as the crosstalk compensation unit 162 illustrated in FIG. 3.

(Receiving Unit (ch2) of Receiving Device According to Second Embodiment)

Figure 15:
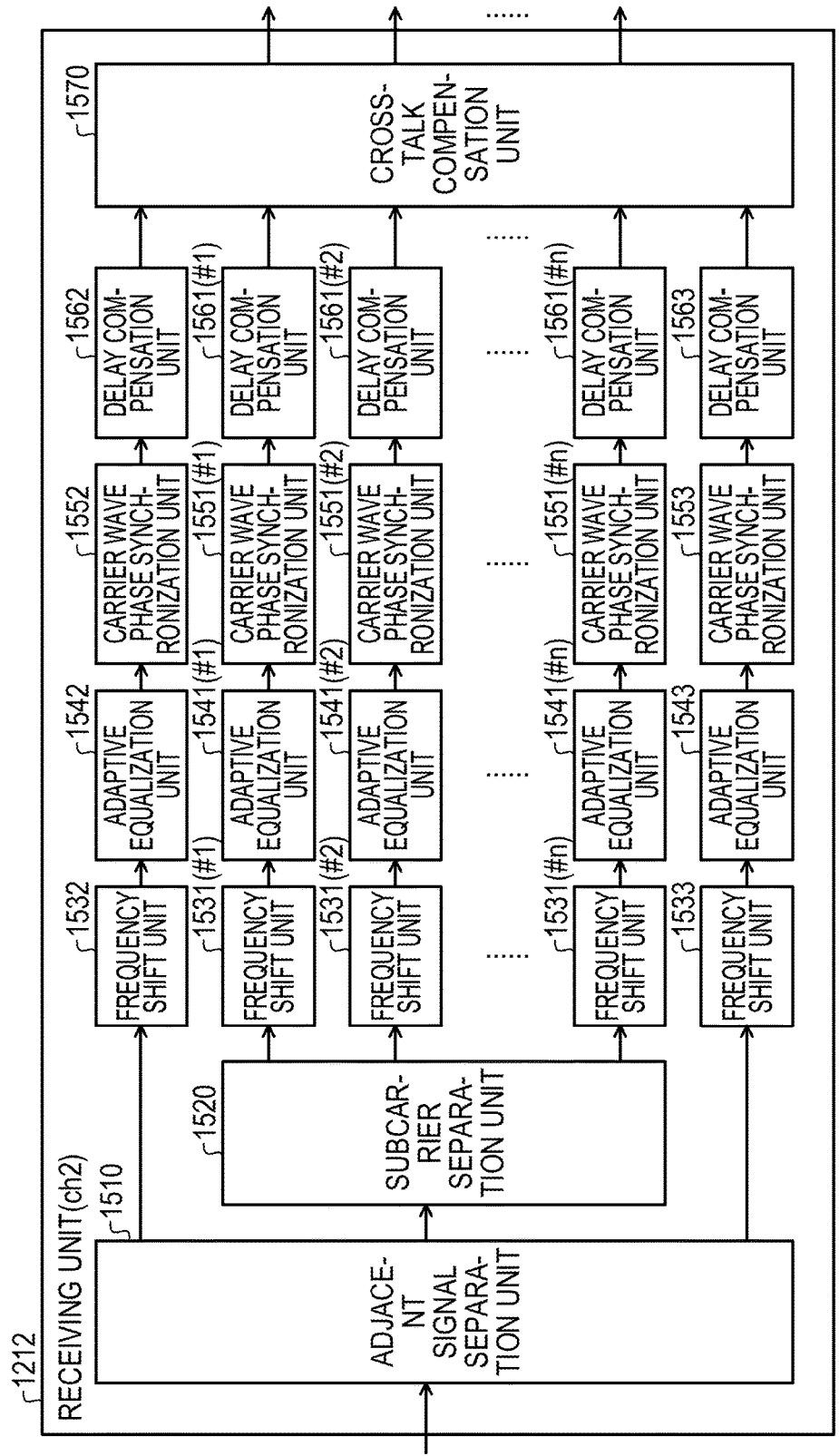
FIG. 15 is a view illustrating an example of a receiving unit (ch2) of the receiving device according to the second embodiment.

FIG. 15 is a view illustrating an example of the receiving unit (ch2) of the receiving device according to the second embodiment. Referring to FIG. 15, the receiving unit 1212 that performs the process of receiving the optical signal 1020 (channel ch2) may include an adjacent signal separation unit 1510, a subcarrier separation unit 1520, and frequency shift units 1531 (#1 to #n), 1532, and 1533. The receiving unit 1212 may further include adaptive equalization units 1541 (#1 to #n), 1542, and 1543, carrier wave phase synchronization units 1551 (#1 to #n), 1522, and 1553, delay compensation units 1561 (#1 to #n), 1562, and 1563, and a crosstalk compensation unit 1570.

The receiving unit 1212 has the same configuration as the receiving unit 1211 illustrated in FIG. 13. However, the signal output from the ADC 122 illustrated in FIG. 12 is input to the adjacent signal separation unit 1510. This signal includes the optical signal 1020, a portion of subcarriers 1011 of the optical signal 1010 adjacent to the optical signal 1020, and a portion of subcarriers 1031 of the optical signal 1030 adjacent to the optical signal 1020.

The adjacent signal separation unit 1510 separates a portion of subcarriers 1011 of the optical signal 1010 adjacent to the optical signal 1020 and a portion of subcarriers 1031 of the optical signal 1030 adjacent to the optical signal 1020 from the input signal. Then, the adjacent signal separation unit 1510 outputs the separated subcarriers 1011 of the optical signal 1010 to the frequency shift unit 1532. Further, the adjacent signal separation unit 1510 outputs the separated subcarriers 1031 of the optical signal 1030 to the frequency shift unit 1533.

The frequency shift unit 1532 performs a frequency shifting for the subcarriers output from the adjacent signal separation unit 1510 so that the subcarriers become basebands, and outputs the frequency-shifted subcarriers to the adaptive equalization unit 1542. The frequency shift unit 1533 performs frequency shifting for the subcarriers output from the adjacent signal separation unit 1510 so that the subcarriers become basebands, and outputs the frequency-shifted subcarriers to the adaptive equalization unit 1543.

The adaptive equalization unit 1542 performs an adaptive equalization processing on the subcarriers output from the frequency shift unit 1532 and outputs the obtained X polarized and Y polarized signals to the carrier wave phase synchronization unit 1552. The adaptive equalization unit 1543 performs an adaptive equalization processing on the subcarriers output from the frequency shift unit 1533 and outputs the obtained X polarized and Y polarized signals to the carrier wave phase synchronization unit 1553.

The carrier wave phase synchronization unit 1552 performs a carrier wave phase synchronization processing on the X polarized and Y polarized signals output from the adaptive equalization unit 1542, and outputs the signals subjected to the carrier wave phase synchronization processing to the delay compensation unit 1562.

The delay compensation unit 1562 performs delay compensation on the X polarized and Y polarized signals output from the carrier wave phase synchronization unit 1552, and outputs the delay-compensated signals to the crosstalk compensation unit 1570. As a result, the X polarized and Y polarized signals demodulated for a portion of subcarriers 1011 of the optical signal 1010 are output to the crosstalk compensation unit 1570.

The delay compensation unit 1563 performs a delay compensation on the X polarized and Y polarized signals output from the carrier wave phase synchronization unit 1553, and outputs the delay-compensated signals to the crosstalk compensation unit 1570. As a result, the X polarized and Y polarized signals demodulated for a portion of subcarriers 1031 of the optical signal 1030 are output to the crosstalk compensation unit 1570.

The crosstalk compensation unit 1570 compensates for a crosstalk to each signal (X polarized signal and Y polarized signal) of each subcarrier of the optical signal 1020 based on each signal output from the delay compensation units 1561 (#1 to #n), 1562, and 1563. Then, the crosstalk compensation unit 1570 outputs each signal of each subcarrier of the optical signal 1020 compensated for the crosstalk.

(Receiving Unit (ch3) of Receiving Device According to Second Embodiment)

The receiving unit 1213 that performs the process of receiving the optical signal 1030 (channel ch3) may have the same configuration as the receiving unit 1212 (see, e.g., FIG. 14) that performs the process of receiving the optical signal 1020 (channel ch2).

(Crosstalk Compensation Unit (ch2) of Receiving Device According to Second Embodiment)

Figure 16:
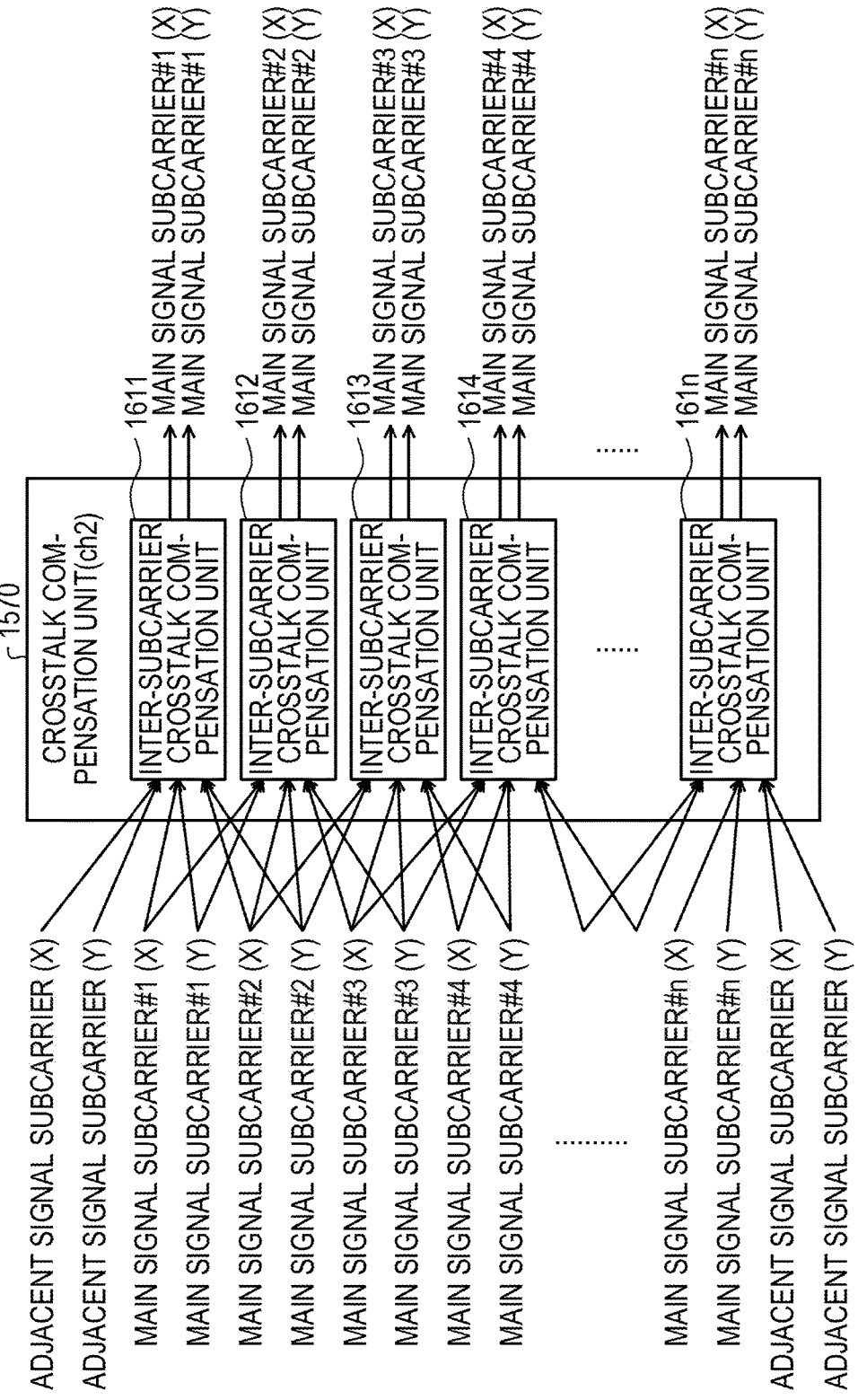
FIG. 16 is a view illustrating an example of a crosstalk compensation unit (ch2) of the receiving device according to the second embodiment.

FIG. 16 is a view illustrating an example of the crosstalk compensation unit (ch2) of the receiving device according to the second embodiment. Referring to FIG. 16, the crosstalk compensation unit 1570 may include n inter-subcarrier crosstalk compensation units 1611 to 161*n*. The symbol n represents the number of subcarriers included in the optical signal 1020.

The inter-subcarrier crosstalk compensation units 1611 to 161*n* are the same as the inter-subcarrier crosstalk compensation units 1411 to 141*n* illustrated in FIG. 14. However, the inter-subcarrier crosstalk compensation unit 1611 receives each polarized signal (X polarized and Y polarized signals) of the first and second subcarriers #1 and #2 of the optical signal 1020 (main signal) from the delay compensation units 1561 (#1 and #2) illustrated in FIG. 15. In addition, the inter-subcarrier crosstalk compensation unit 1611 receives each polarized signal of a subcarrier having a frequency closest to the frequency of the optical signal 1020 among the subcarriers of the optical signal 1010 (adjacent signal) from the delay compensation unit 1562 illustrated in FIG. 15. The inter-subcarrier crosstalk compensation unit 1611 compensates for a crosstalk from the subcarrier #2 and the subcarrier of the optical signal 1010 to each polarized signal of the subcarrier #1, and outputs each polarized signal of the subcarrier #1 compensated for the crosstalk.

The inter-subcarrier crosstalk compensation units 1611 to 161*n* illustrated in FIG. 16 may have the same configuration as the crosstalk compensation unit 162 illustrated in FIG. 3, for example.

(Another Example of Crosstalk Compensation Unit (ch1) According to Second Embodiment)

Figure 17:
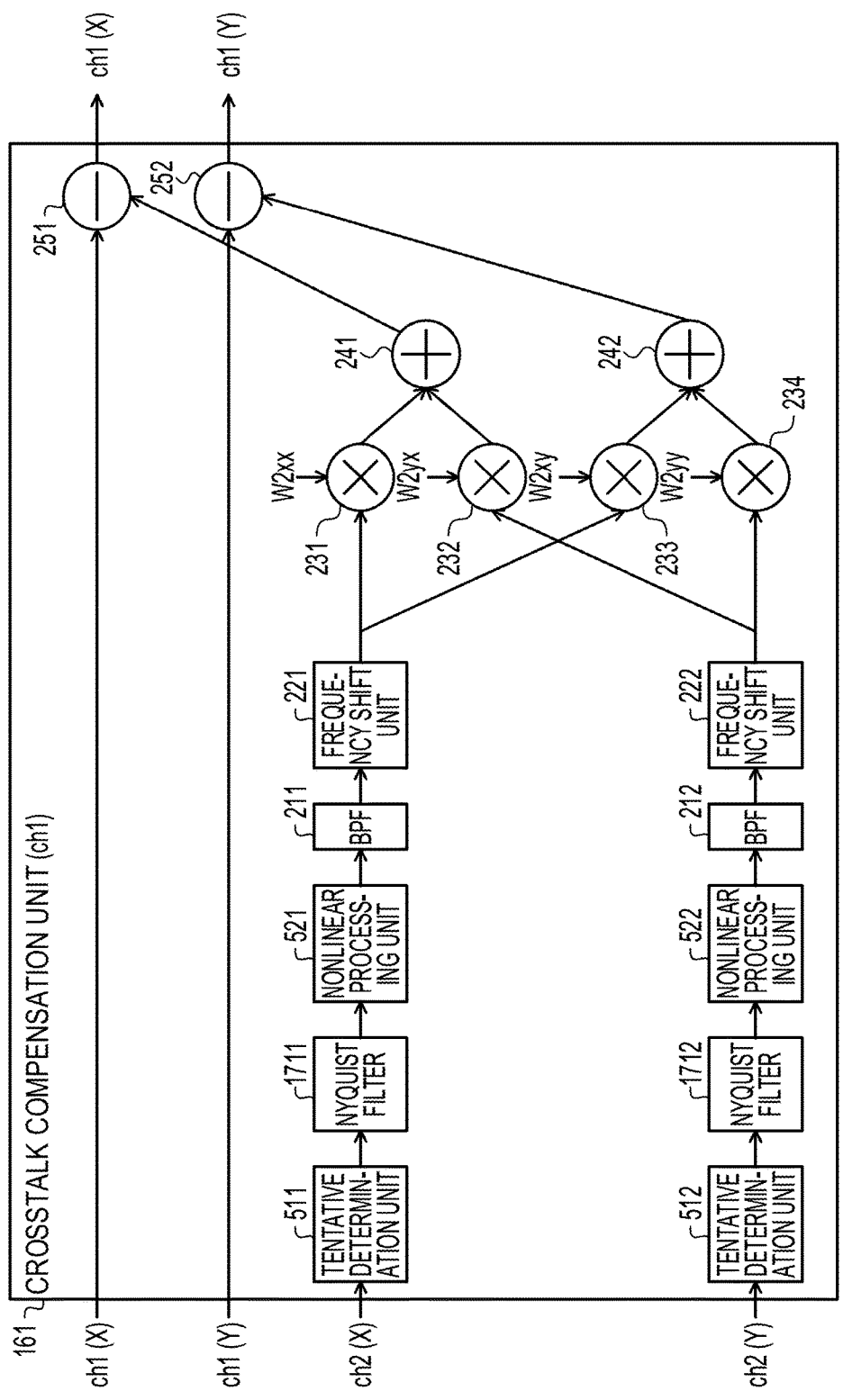
FIG. 17 is a view illustrating another example of the crosstalk compensation unit (ch1) according to the second embodiment.

FIG. 17 is a view illustrating another example of the crosstalk compensation unit (ch1) according to the second embodiment. In FIG. 17, the same parts and units as in FIG. 5 are denoted by the same reference numerals, and explanation of which will not be repeated. The second embodiment may also use the configuration of the crosstalk compensation unit 161 that performs the tentative determination as illustrated in FIG. 5. In this case, as illustrated in FIG. 17, the crosstalk compensation unit 161 may include Nyquist filters 1711 and 1712 in addition to the configuration illustrated in FIG. 5. The crosstalk compensation unit 161 illustrated in FIG. 17 may be used, for example, in the inter-subcarrier crosstalk compensation unit 1411 illustrated in FIG. 14.

The tentative determination unit 511 outputs the tentatively determined signal to the Nyquist filter 1711. The Nyquist filter 1711 Nyquist-pulses the signal output from the tentative determination unit 511 by filtering and outputs the Nyquist-pulsed signal to the nonlinear processing unit 521. The nonlinear processing unit 521 performs filtering that gives a predetermined nonlinear distortion to the signal output from the Nyquist filter 1711.

The tentative determination unit 512 outputs the tentatively determined signal to the Nyquist filter 1712. The Nyquist filter 1712 Nyquist-pulses the signal output from the tentative determination unit 512 by filtering and outputs the Nyquist-pulsed signal to the nonlinear processing unit 522. The nonlinear processing unit 522 performs filtering that gives a predetermined nonlinear distortion to the signal output from the Nyquist filter 1712.

For example, the Nyquist filters 1711 and 1712 are filters having the same filtering characteristics as the Nyquist filter included in the transmitting device 720 illustrated in FIG. 7. With the configuration illustrated in FIG. 17, the signal of the channel ch2 which is Nyquist-pulsed by the Nyquist filter of the transmitting device 720 and is affected by the nonlinear distortion of the transmitting device 720 is reproduced, and the crosstalk may be compensated based on the reproduced signal.

(Another Example of Crosstalk Compensation Unit (ch2) According to Second Embodiment)

Figure 18:
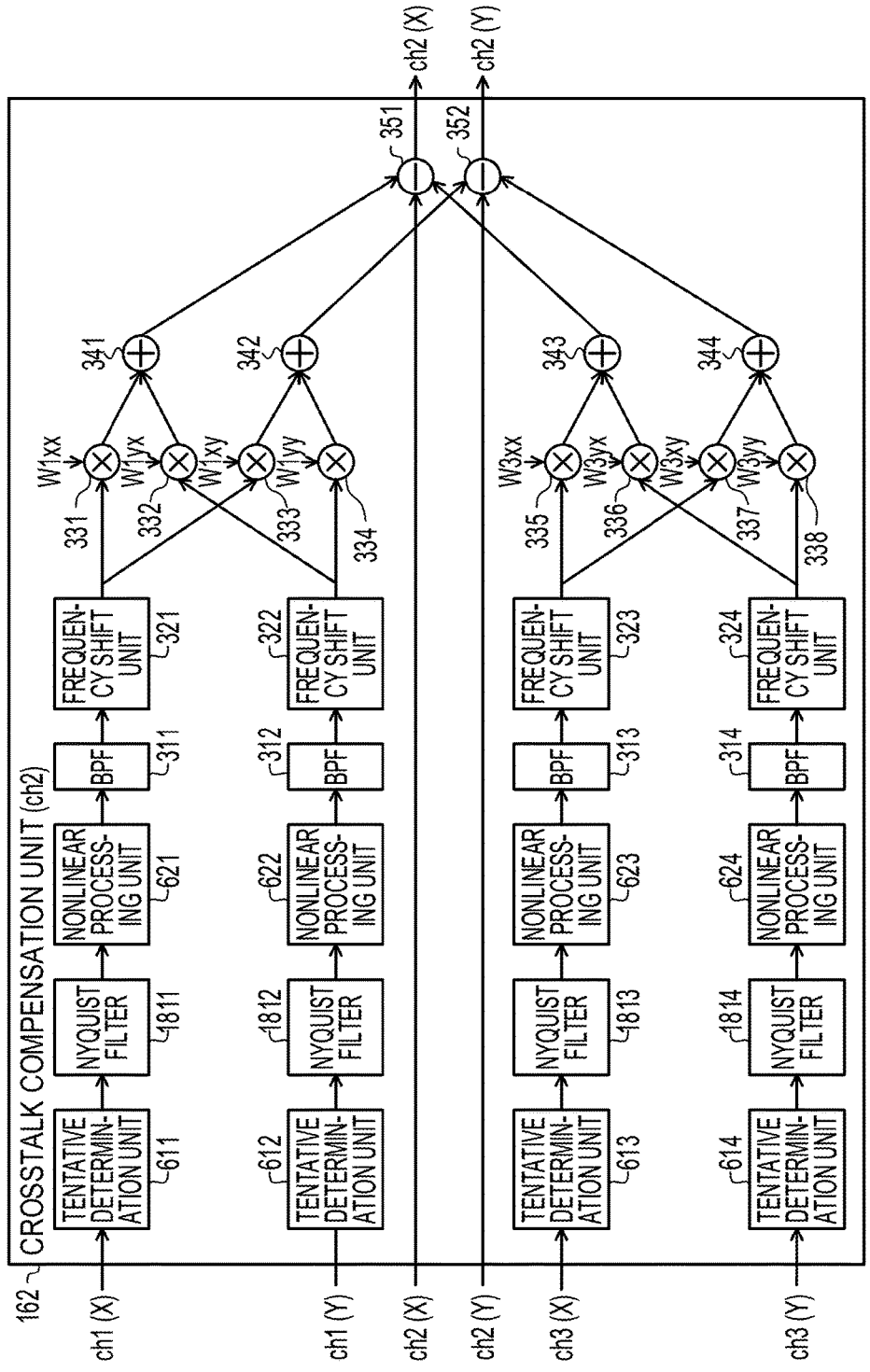
FIG. 18 is a view illustrating another example of the crosstalk compensation unit (ch2) according to the second embodiment.

FIG. 18 is a view illustrating another example of the crosstalk compensation unit (ch2) according to the second embodiment. In FIG. 18, the same parts and units as in FIG. 6 are denoted by the same reference numerals, explanation of which will not be repeated. The second embodiment may also use the configuration of the crosstalk compensation unit 162 that performs the tentative determination as illustrated in FIG. 6. In this case, as illustrated in FIG. 18, the crosstalk compensation unit 162 may include Nyquist filters 1811 to 1814 in addition to the configuration illustrated in FIG. 5. The crosstalk compensation unit 162 illustrated in FIG. 18 may be used, for example, in the inter-subcarrier crosstalk compensation units 1412 to 141*n* illustrated in FIG. 14 and the inter-subcarrier crosstalk compensation units 1611 to 161*n* illustrated in FIG. 16.

The tentative determination unit 611 outputs the tentatively determined signal to the Nyquist filter 1811. The Nyquist filter 1811 Nyquist-pulses the signal output from the tentative determination unit 611 by filtering and outputs the Nyquist-pulsed signal to the nonlinear processing unit 621. The nonlinear processing unit 621 performs filtering that gives a predetermined nonlinear distortion to the signal output from the Nyquist filter 1811.

The tentative determination unit 612 outputs the tentatively determined signal to the Nyquist filter 1812. The Nyquist filter 1812 Nyquist-pulses the signal output from the tentative determination unit 612 by filtering and outputs the Nyquist-pulsed signal to the nonlinear processing unit 622. The nonlinear processing unit 622 performs filtering that gives a predetermined nonlinear distortion to the signal output from the Nyquist filter 1812.

The tentative determination unit 613 outputs the tentatively determined signal to the Nyquist filter 1813. The Nyquist filter 1813 Nyquist-pulses the signal output from the tentative determination unit 613 by filtering and outputs the Nyquist-pulsed signal to the nonlinear processing unit 623. The nonlinear processing unit 623 performs filtering that gives a predetermined nonlinear distortion to the signal output from the Nyquist filter 1813.

The tentative determination unit 614 outputs the tentatively determined signal to the Nyquist filter 1814. The Nyquist filter 1814 Nyquist-pulses the signal output from the tentative determination unit 614 by filtering and outputs the Nyquist-pulsed signal to the nonlinear processing unit 624. The nonlinear processing unit 624 performs filtering that gives a predetermined nonlinear distortion to the signal output from the Nyquist filter 1814.

The Nyquist filters 1811 and 1812 are filters having the same filtering characteristics as the Nyquist filters 712 (#1 to #n) included in the transmitting device 710 illustrated in FIG. 7. As a result, the signal of the channel ch1 which is Nyquist-pulsed by the Nyquist filters 712 (#1 to #n) of the transmitting device 710 and is affected by the nonlinear distortion of the transmitting device 710 is reproduced, and the crosstalk may be compensated based on the reproduced signal.

In addition, the Nyquist filters 1813 and 1814 are filters having the same filtering characteristics as the Nyquist filter included in the transmitting device 730 illustrated in FIG. 7. As a result, the signal of the channel ch3 which is Nyquist-pulsed by the Nyquist filter of the transmitting device 730 and is affected by the nonlinear distortion of the transmitting device 730 is reproduced, and the crosstalk may be compensated based on the reproduced signal.

(Another Example of Receiving Unit (ch1) of Receiving Device According to Second Embodiment)

Figure 19:
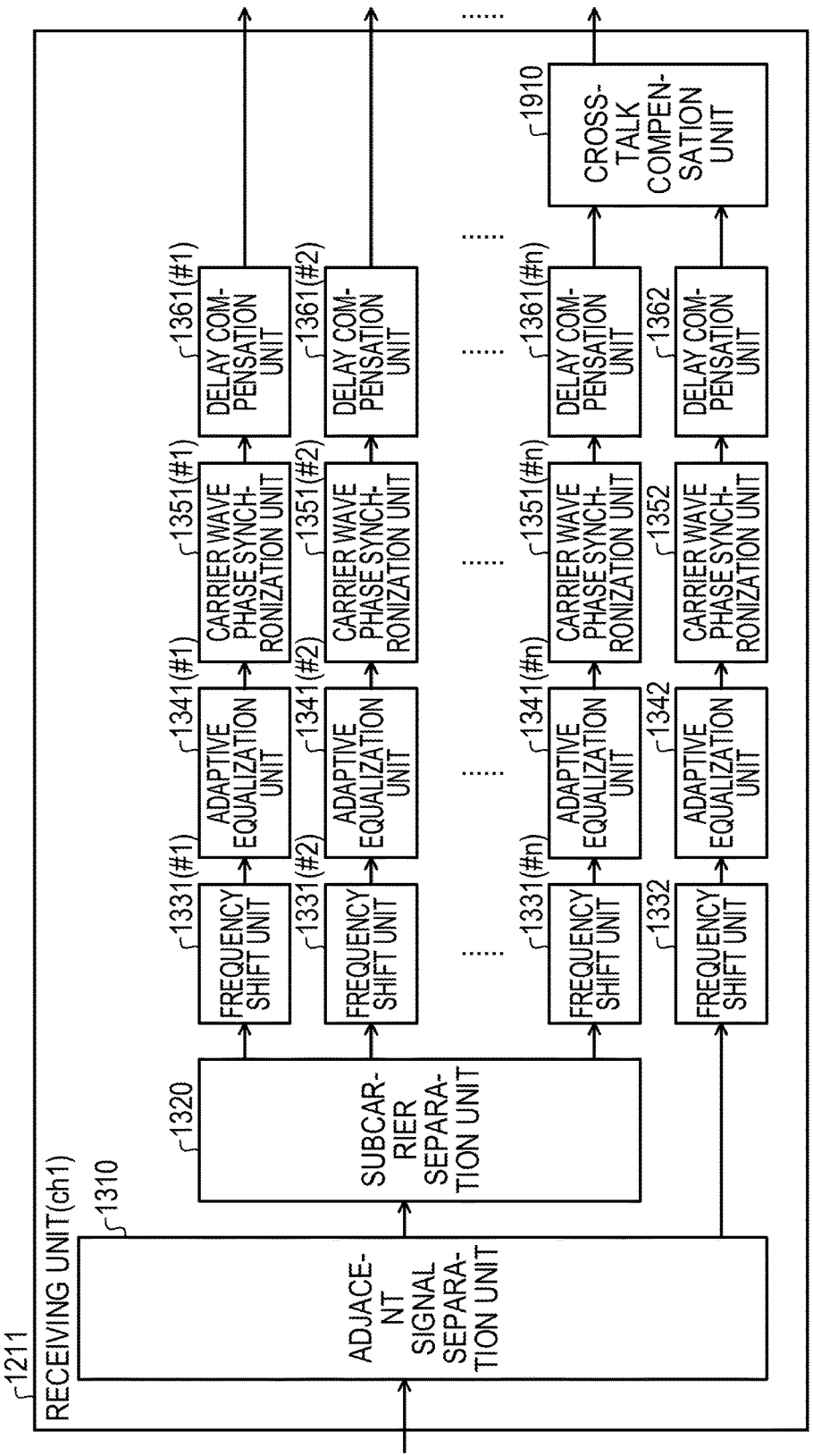
FIG. 19 is a view illustrating another example of the receiving unit (ch1) of the receiving device according to the second embodiment.

FIG. 19 is a view illustrating another example of the receiving unit (ch1) of the receiving device according to the second embodiment. In FIG. 19, the same parts and units as in FIG. 13 are denoted by the same reference numerals, and explanation of which will not be repeated. Referring to FIG. 19, the receiving unit 1211 may include a crosstalk compensation unit 1910 in place of the crosstalk compensation unit 1370 illustrated in FIG. 13. The crosstalk compensation unit 1910 may have the same configuration as the crosstalk compensation unit 161 illustrated in FIG. 2 or 5, for example.

The receiving unit 1211 outputs each signal output from the delay compensation units 1361 (#1 to #n−1). The crosstalk compensation unit 1910 receives each signal output from the delay compensation units 1361 (#n) and 1362. The crosstalk compensation unit 1910 compensates for a crosstalk from the channel ch2 with respect to each signal (X and Y polarized signals) of the highest frequency side ($n^{th}$) subcarrier of the optical signal 1010 based on each signal output from the delay compensation units 1361 (#n) and 1362. Then, the crosstalk compensation unit 1910 outputs each signal of the highest frequency side ($n^{th}$) subcarrier of the optical signal 1010 compensated for the crosstalk.

As illustrated in FIG. 19, the receiving unit 1211 may be configured to compensate for a crosstalk between optical signals and not compensate for a crosstalk between subcarriers in the optical signals. Thus, for example, demodulation processing of subcarriers may be reduced and the circuit scale may also be reduced. In this case, for example, the crosstalk between the subcarriers of the channel ch1 may be compensated (pre-compensated) by the transmitting device 710 illustrated in FIG. 7.

(Another Example of Receiving Unit (ch2) of Receiving Device According to Second Embodiment)

Figure 20:
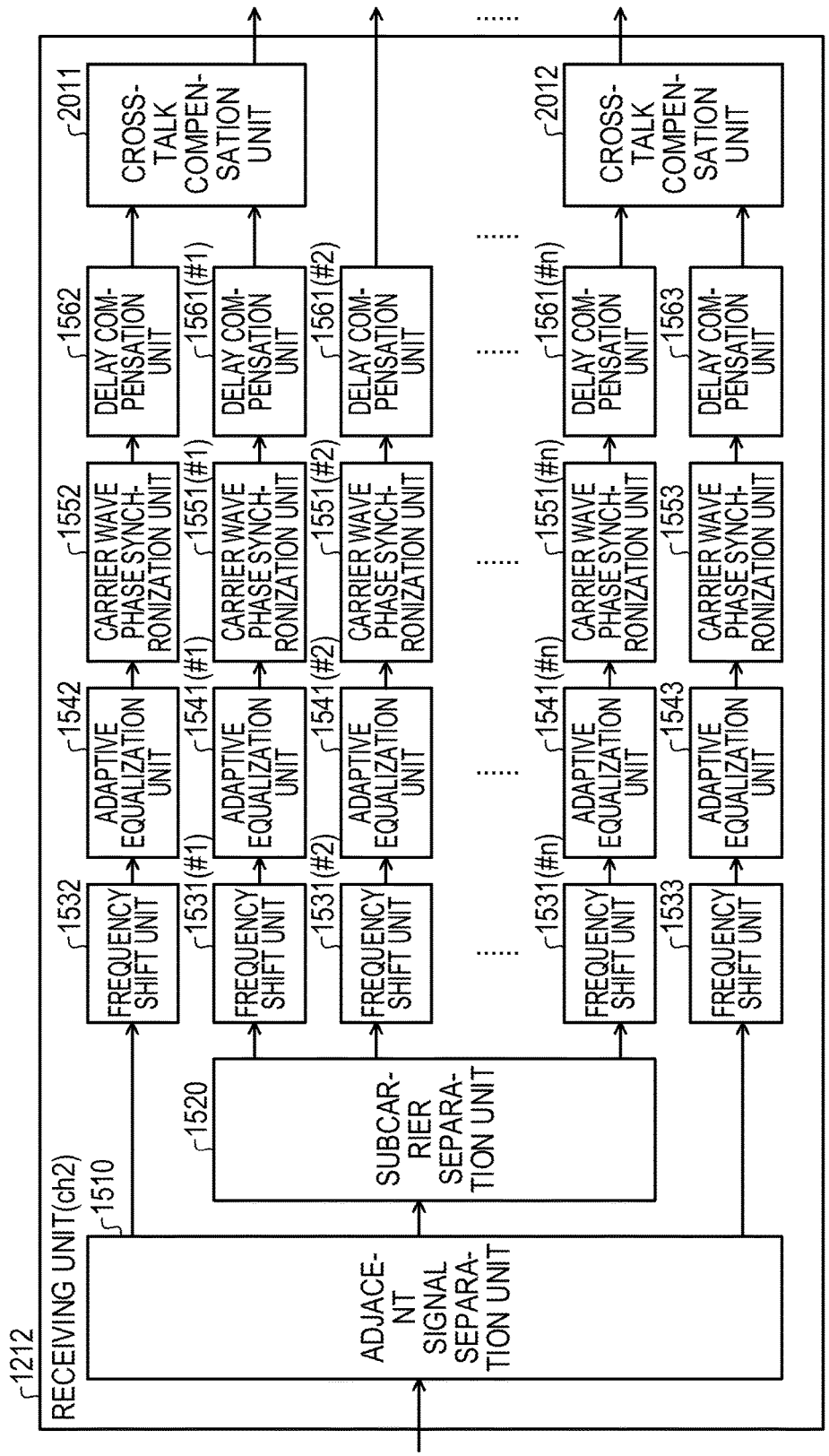
FIG. 20 is a view illustrating another example of the receiving unit (ch2) of the receiving device according to the second embodiment.

FIG. 20 is a view illustrating another example of the receiving unit (ch2) of the receiving device according to the second embodiment. In FIG. 20, the same parts and units as in FIG. 15 are denoted by the same reference numerals, and explanation of which will not be repeated. Referring to FIG. 20, the receiving unit 1212 may include crosstalk compensation units 2011 and 2012 in place of the crosstalk compensation unit 1570 illustrated in FIG. 15. The crosstalk compensation units 2011 and 2012 may have the same configuration as the crosstalk compensation unit 161 illustrated in FIG. 2 or 5, for example. The receiving unit 1212 outputs each signal output from the delay compensation units 1561 (#2 to #n−1).

The crosstalk compensation unit 2011 receives each signal output from the delay compensation units 1561 (#1) and 1562. The crosstalk compensation unit 2011 compensates for a crosstalk from the channel ch1 with respect to each signal (X and Y polarized signals) of the lowest frequency side (first) subcarrier of the optical signal 1020 based on each signal output from the delay compensation units 1561 (#1) and 1562. Then, the crosstalk compensation unit 2011 outputs each signal of the lowest frequency side (first) subcarrier of the optical signal 1020 compensated for the crosstalk.

The crosstalk compensation unit 2012 receives each signal output from the delay compensation units 1561 (#n) and 1563. The crosstalk compensation unit 2012 compensates for a crosstalk from the channel ch3 with respect to each signal (X and Y polarized signals) of the highest frequency side ($n^{th}$) subcarrier of the optical signal 1020 based on each signal output from the delay compensation units 1561 (#n) and 1563. Then, the crosstalk compensation unit 2012 outputs each signal of the highest frequency side ($n^{th}$) subcarrier of the optical signal 1020 compensated for the crosstalk.

As illustrated in FIG. 20, the receiving unit 1212 may be configured to compensate for a crosstalk between optical signals and not compensate for a crosstalk between subcarriers in the optical signals. Thus, for example, demodulation processing of subcarriers may be reduced and the circuit scale may also be reduced. In this case, for example, the crosstalk between the subcarriers of the channel ch2 may be compensated (pre-compensated) by the transmitting device 720 illustrated in FIG. 7.

(Another Example of Receiving Unit (ch3) of Receiving Device According to Second Embodiment)

The receiving unit 1213 that receives the signal of the channel ch3 may also be configured to compensate for a crosstalk between optical signals and not compensate for a crosstalk between subcarriers in the optical signals, for example, as the receiving unit 1211 illustrated in FIG. 19. Thus, for example, demodulation processing of subcarriers may be reduced and the circuit scale may also be reduced. In this case, for example, the crosstalk between the subcarriers of the channel ch3 may be compensated (pre-compensated) by the transmitting device 730 illustrated in FIG. 7.

(Still Another Example of Receiving Unit (ch1) of Receiving Device According to Second Embodiment)

Figure 21:
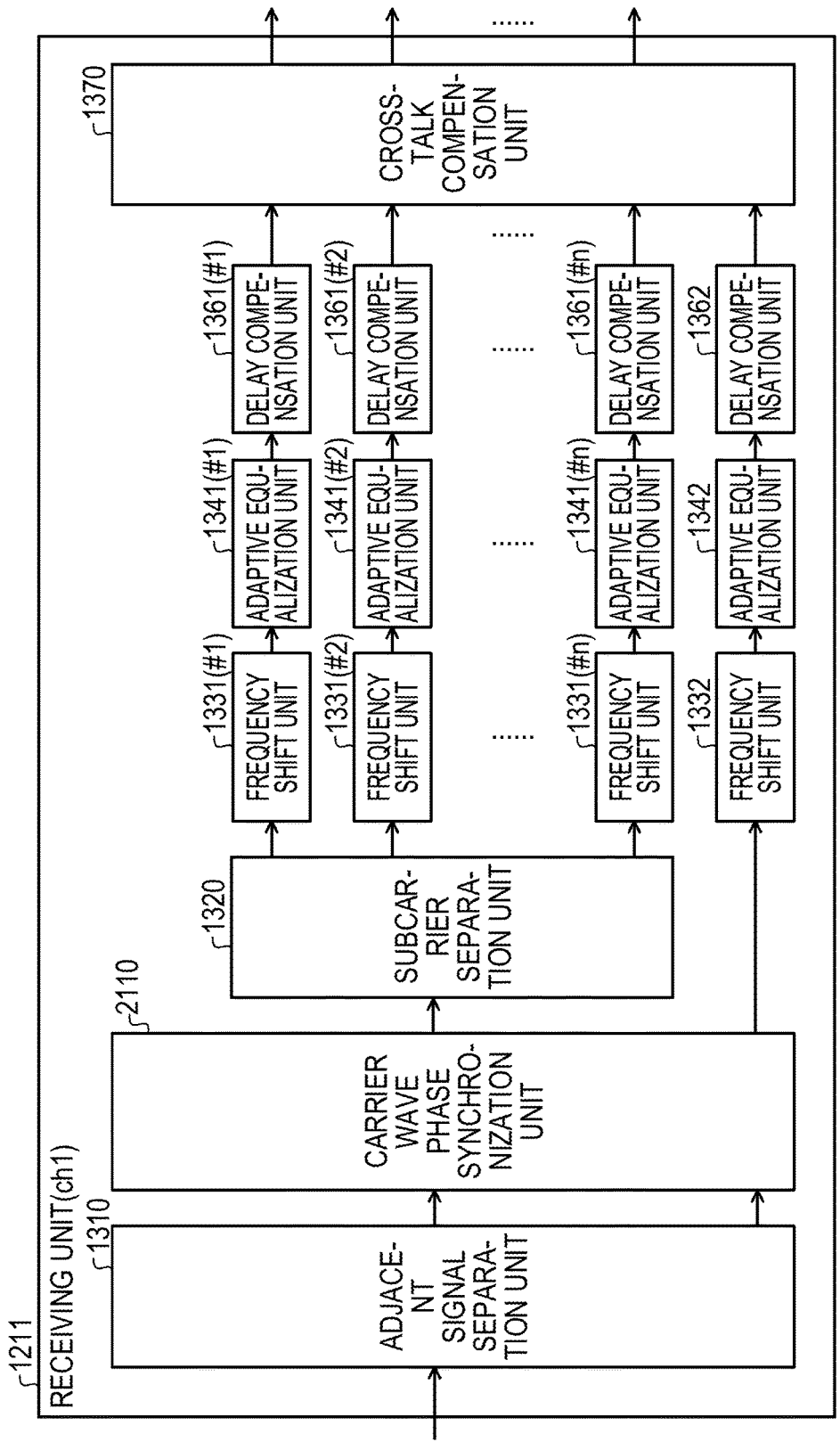
FIG. 21 is a view illustrating still another example of the receiving unit (ch1) of the receiving device according to the second embodiment.

FIG. 21 is a view illustrating still another example of the receiving unit (ch1) of the receiving device according to the second embodiment. In FIG. 21, the same parts and units as in FIG. 13 are denoted by the same reference numerals, explanation of which will not be repeated. Referring to FIG. 21, the receiving unit 1211 may include a carrier wave phase synchronization unit 2110 in place of the carrier wave phase synchronization units 1351 (#1 to #n) and 1352 illustrated in FIG. 13.

The carrier wave phase synchronization unit 2110 has the same configuration as the carrier wave phase synchronization units 1351 (#1 to #n) and 1352 illustrated in FIG. 13, for example. However, the carrier wave phase synchronization unit 2110 performs carrier wave phase synchronization processing between the adjacent signal separation unit 1310 and the subcarrier separation unit 1320. In addition, the carrier wave phase synchronization unit 2110 performs phase synchronization of adjacent signals using a phase noise of the main signal.

As in the example illustrated in FIG. 21, various modifications may be made to the processing unit that demodulates the optical signals in the receiving unit 1211. A modification of the processing unit that demodulates the optical signals in the receiving unit 1211 has been described, but the same applies to the processing unit that demodulates the optical signals in the receiving units 1212 and 1213.

In this manner, according to the receiving device 100 of the second embodiment, in the configuration in which the signal light including each signal wavelength-multiplexed in the electric stage is coherently received, it is possible to compensate for a crosstalk while suppressing an increase in circuit scale, similarly to the first embodiment.

In addition, the receiving device 100 may coherently receive the signal light obtained by wavelength-multiplexing the first optical signal based on the first signal and the second optical signal based on the signal obtained by electrically wavelength-multiplexing the plurality of signals including the second signal. In this case, the receiving device 100 demodulates some signals of the second optical signal as the second signal and extracts a signal component of crosstalk from the signal obtained by the demodulation to the first signal. This makes it possible to suppress the circuit scale as compared with a configuration of demodulating all the signals of the second optical signal for compensation of a crosstalk of the first signal.

In addition, some signals of the second optical signal include a signal wavelength-multiplexed with a frequency closest to the frequency of the first signal among the signals of the second optical signal. A signal having the largest crosstalk amount with respect to the first signal among the signals of the second optical signal may be demodulated and used for compensation of the crosstalk of the first signal. As a result, it is possible to accurately compensate for a crosstalk while suppressing the circuit scale.

In addition, similarly to the first optical signal, the second optical signal may also be an optical signal based on a signal obtained by electrically wavelength-multiplexing a plurality of signals. In this case, the receiving device 100 may be configured to compensate for a crosstalk of the second signal of the second optical signal with respect to the first signal of the first optical signal and not compensate for a crosstalk between the signals included in the first optical signal. As a result, it is possible to suppress the circuit scale of the receiving device 100. In this case, the compensation of the crosstalk between the signals included in the first optical signal may be performed, for example, in a transmitting device that transmits the first optical signal.

In addition, the receiving device 100 may determine a signal obtained by demodulation of the second signal, Nyquist-pulse the signal obtained by the determination, give a nonlinear distortion to the Nyquist-pulsed signal, and extract a crosstalk signal component from the signal given the nonlinear distortion. For example, the receiving device 100 Nyquist-pulses the signal obtained by the determination by giving a filter to the second signal when the transmitting device that transmits the second signal Nyquist-pulses the second signal. As a result, it is possible to accurately extract a signal component of a crosstalk corresponding to a distortion of a Nyquist waveform due to the nonlinear distortion on the transmission side of the signal light and accurately compensate for the crosstalk.

The configuration in which the receiving device 100 receives the NFDM optical signal has been described in the second embodiment, but the present disclosure is not limited to such a configuration. For example, in the second embodiment, the receiving device 100 may be configured to receive an optical signal of orthogonal frequency division multiplexing (OFDM).

(Processing by Receiving Device According to Each Embodiment)

Figure 22:
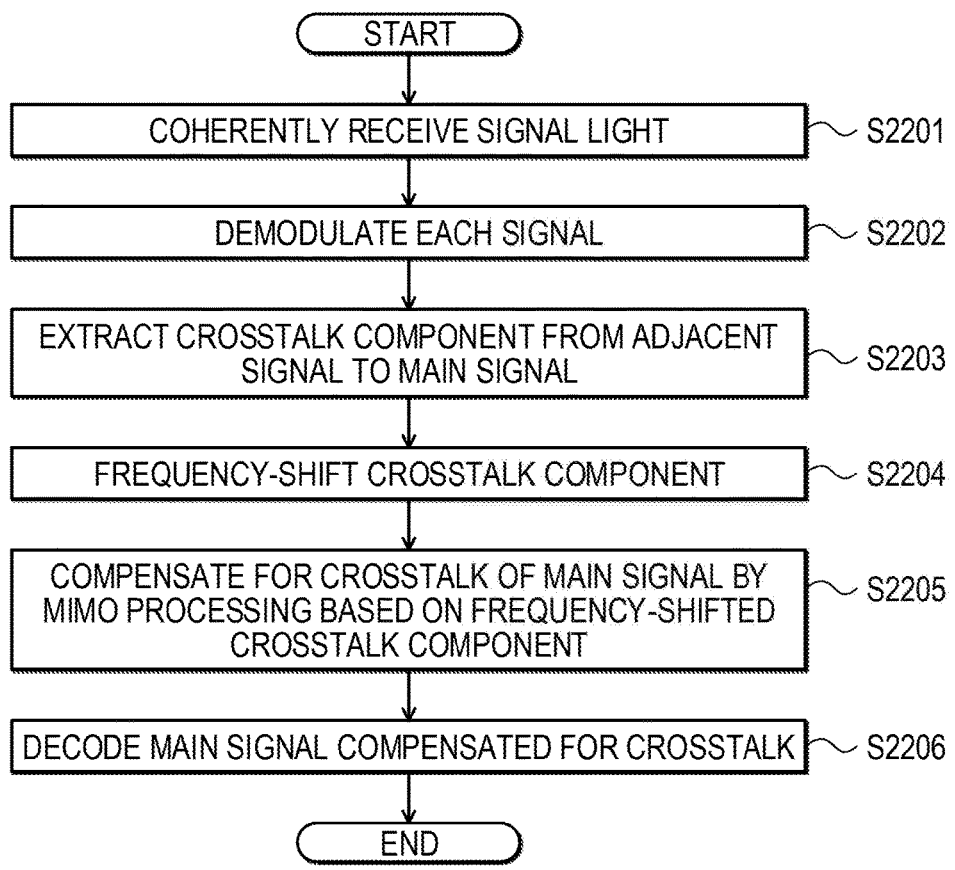
FIG. 22 is a flowchart illustrating an example of a process by a receiving device according to each embodiment.

FIG. 22 is a flowchart illustrating an example of a process by the receiving device according to each embodiment. The receiving device 100 according to the above-described first and second embodiments executes each operation illustrated in FIG. 22, for example. First, the receiving device 100 performs coherent reception of the signal light transmitted via the optical transmission line (operation S2201). The operation S2201 is executed by, for example, the coherent receiving FEs 111 to 113 illustrated in FIG. 1 or 12, for example.

Next, the receiving device 100 performs demodulation of each signal included in the signal light based on a result of the coherent reception in the operation S2201 (operation S2202). The operation S2202 is executed by each adaptive equalization unit, each carrier wave phase synchronization unit, and each delay compensation unit illustrated in FIG. 1, for example. Alternatively, the operation S2202 is executed by the adjacent signal separation unit 1310, the subcarrier separation unit 1320, each frequency shift unit, each adaptive equalization unit, each carrier wave phase synchronization unit, and each delay compensation unit, for example, illustrated in one of FIGS. 13, 15, and 19 to 21.

Next, the receiving device 100 extracts a crosstalk component to the main signal in the adjacent signal of the main signal targeted for crosstalk compensation among the signals obtained by the demodulation process in the operation S2202 (operation S2203). The operation S2203 is executed by each BPF, for example, illustrated in FIG. 2, 3, 5, 6, 17, or 18.

Next, the receiving device 100 frequency-shifts the crosstalk component extracted in the operation S2203 (operation S2204). The operation S2204 is executed by each frequency shift unit, for example, illustrated in FIG. 2, 3, 5, 6, 17, or 18.

Next, the receiving device 100 compensates for a crosstalk of the main signal by MIMO processing based on the crosstalk component frequency-shifted in the operation S2204 (operation S2205). The operation S2205 is executed by each multiplication unit, each addition unit, and each subtraction unit illustrated in FIG. 2, 3, 5, 6, 17, or 18.

Next, the receiving device 100 decodes the main signal compensated for the crosstalk in the operation S2205 (operation S2206) and ends the series of processing. The operation S2206 is executed by the decoding unit at the subsequent stage of the crosstalk compensation unit, for example, illustrated in one of FIGS. 1, 13, 15, and 19 to 21.

As illustrated in FIG. 22, extracting the crosstalk component of the adjacent signal before frequency shifting and MIMO processing of the adjacent signal makes it possible to narrow the signal band in a circuit that performs frequency shifting and MIMO processing (e.g., to the aforementioned BW or so). Therefore, it is possible to compensate for a crosstalk while suppressing an increase in circuit scale.

As described above, according to the receiving device and the receiving method, a crosstalk may be compensated while suppressing an increase in circuit scale.

For example, with the recent increase in data traffic volume, there is a demand for further increase in capacity of an optical fiber transmission system. In order to meet such a demand, there has been proposed a technique in which the spectrum of an optical signal is made rectangular and narrowed by OFDM, Nyquist filtering, or the like to reduce the occupied band of the optical signal. Using the OFDM or Nyquist filtering technique makes it possible to densely multiplex the frequency spacings of wavelength multiplexed signals to the order of a symbol rate.

However, in some cases, incompleteness may occur in a Nyquist waveform due to, for example, degradation of the linearity in a transmitting device circuit. In such a case, leakage of a signal out of a signal band due to pulse spreading may increase and a crosstalk between channels may become large. The influence of this crosstalk increases with the increase in the number of multi-levels of modulation. For example, in 32 quadrature amplitude modulation (QAM) or 64 QAM, a crosstalk between channels becomes large.

Even when nonlinear response compensation is performed on such a crosstalk, for example, by signal processing, it is difficult to completely suppress the crosstalk since there is a limitation in the calculation accuracy of a signal processing circuit. In the meantime, it is conceivable to widen a channel spacing in order to reduce the influence of the crosstalk, but which may result in deterioration of the frequency utilization efficiency.

In addition, since a circuit for compensating the crosstalk requires processing in a wide signal band including a signal to be compensated and a signal of an adjacent channel to act as a crosstalk to the signal to be compensated, the circuit scale becomes large.

In contrast, according to each of the above-described embodiments, a signal component to act as a crosstalk is extracted from a signal demodulated from a result of the coherent reception and may be frequency-shifted and used for crosstalk compensation. This makes it possible to narrow the band of a frequency shifter that frequency-shifts a signal component acting as a crosstalk or a compensation circuit that performs crosstalk compensation and accordingly, compensate for the crosstalk while suppressing an increase in circuit scale.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving device comprising:
a memory; and
a hardware processor coupled to the memory,
wherein the hardware processor is configured to:
demodulate a signal into which a first signal and a second signal are wavelength-multiplexed, into a first baseband signal and a second baseband signal corresponding to the first signal and the second signal, respectively;
determine the second baseband signal;
add a nonlinear distortion to the determined second baseband signal by a non-linear filter;
extract, from the second baseband signal to which the nonlinear distortion is added by the nonlinear filter, a signal component of crosstalk from the second signal to the first signal;
shift a frequency of the extracted signal component; and
compensate for the crosstalk from the second signal to the first signal, based on the extracted signal component shifted by the frequency.

2. The receiving device according to claim 1, wherein each of the first signal and the second signal is wavelength-multiplexed by different frequencies.

3. The receiving device according to claim 1, wherein the hardware processor is configured to shift the frequency of the extracted signal component by an amount corresponding to a difference between center frequencies of the first signal and the second signal.

4. The receiving device according to claim 1, wherein the nonlinear filter is configured to add, to the determined second baseband signal, the nonlinear distortion added to the second signal by a transmitting device configured to transmit the second signal.

5. The receiving device according to claim 1, wherein the hardware processor is further configured to: generate a Nyquist-pulsed signal based on the determined second baseband signal, wherein the second signal is the Nyquist-pulsed signal, and wherein the nonlinear filter is configured to add the nonlinear distortion to the Nyquist-pulsed signal.

6. The receiving device according to claim 1, wherein the first signal and the second signal are electrically wavelength-multiplexed so as to be optically transmitted.

7. The receiving device according to claim 1, wherein a first optical signal corresponding to the first signal and a second optical signal corresponding to the second signal are wavelength-multiplexed so as to be optically transmitted.

8. The receiving device according to claim 1, wherein a first optical signal corresponding to the first signal and s second optical signal corresponding to a signal to which a plurality of signals including the second signal are electrically wavelength-multiplexed are wavelength-multiplexed so as to be optically transmitted, and wherein the second signal has a frequency closest to a frequency of the first signal among the plurality of signals including the second signal.

9. The receiving device according to claim 8, wherein the first optical signal corresponds to a signal to which a plurality of signals including the first signal are electrically wavelength-multiplexed, and wherein the hardware processor does not compensate for a crosstalk between the plurality of signals including the first signal.

10. The receiving device according to claim 1, wherein the hardware processor is configured to weight the extracted signal component frequency-shifted and compensate for the crosstalk based on the weighted signal component.

11. The receiving device according to claim 10, wherein the hardware processor is further configured to generate information indicating an amount of crosstalk from the second signal to the first signal, based on coefficients of the weighting for the extracted signal component.

12. A receiving method comprising:
demodulating a signal into which a first signal and a second signal are wavelength-multiplexed, into a first baseband signal and a second baseband signal, respectively;
determining the second baseband signal;
adding a nonlinear distortion to the determined second baseband signal by a non-linear filter;
extracting, from the second baseband signal to which the nonlinear distortion is added by the nonlinear filter, a signal component of a crosstalk from the second signal to the first signal;
shifting a frequency of the extracted signal component; and compensating for the crosstalk from the second signal to the first signal, based on the extracted signal component shifted by the frequency, by a hardware processor.

\* \* \* \* \*